United States Patent
Kasturi et al.

(10) Patent No.: US 8,018,866 B1
(45) Date of Patent: Sep. 13, 2011

(54) ADAPTIVELY APPLYING NETWORK ACCELERATION SERVICES WITH AN INTERMEDIATE NETWORK DEVICE

(75) Inventors: Rohini Kasturi, Livermore, CA (US); Nitin Gugle, Cupertino, CA (US); Sravan Vadlakonda, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 216 days.

(21) Appl. No.: 12/198,652

(22) Filed: Aug. 26, 2008

(51) Int. Cl.
*H04L 12/26* (2006.01)
(52) U.S. Cl. ............ 370/252; 370/230.1; 370/254; 370/401
(58) Field of Classification Search ............ 370/237, 370/238, 248, 252, 254, 401, 230.1, 392; 709/238
See application file for complete search history.

(56) References Cited

U.S. PATENT DOCUMENTS

| | | | |
|---|---|---|---|
| 5,598,532 A | 1/1997 | Liron | |
| 6,301,244 B1 | 10/2001 | Huang et al. | |
| 6,377,551 B1 | 4/2002 | Luo et al. | |
| 6,473,405 B2 | 10/2002 | Ricciulli | |
| 6,981,055 B1 | 12/2005 | Ahuja et al. | |
| 7,020,087 B2* | 3/2006 | Steinberg et al. | 370/238 |
| 7,167,593 B2 | 1/2007 | Singh | |
| 7,200,117 B2 | 4/2007 | Chiu et al. | |
| 7,254,138 B2 | 8/2007 | Sandstrom | |
| 7,289,489 B1 | 10/2007 | Kung et al. | |
| 7,339,897 B2 | 3/2008 | Larsson et al. | |
| 7,403,487 B1* | 7/2008 | Foladare et al. | 370/252 |
| 7,496,661 B1 | 2/2009 | Morford et al. | |
| 7,584,298 B2* | 9/2009 | Klinker et al. | 709/238 |
| 7,599,385 B1 | 10/2009 | Andrade et al. | |
| 7,643,408 B2 | 1/2010 | Atkinson et al. | |
| 7,650,426 B2 | 1/2010 | Bamba | |
| 7,688,739 B2 | 3/2010 | Frei et al. | |
| 2006/0146825 A1* | 7/2006 | Hofstaedter et al. | 370/392 |
| 2008/0091812 A1 | 4/2008 | Lev-Ran et al. | |
| 2008/0112325 A1 | 5/2008 | Sivakumar et al. | |
| 2008/0123533 A1* | 5/2008 | Vasseur et al. | 370/238 |
| 2008/0225710 A1* | 9/2008 | Raja et al. | 370/230.1 |
| 2008/0320151 A1 | 12/2008 | McCanne et al. | |
| 2009/0034417 A1* | 2/2009 | Kondamuru et al. | 370/238 |
| 2009/0067440 A1* | 3/2009 | Chadda et al. | 370/401 |

(Continued)

OTHER PUBLICATIONS

U.S. Appl. No. 12/254,034, filed Oct. 20, 2008 entitled, "Service Aware Path Selection With a Network Acceleration Device," Rohini Kasturi et al.

(Continued)

*Primary Examiner* — Hassan Kizou
*Assistant Examiner* — Toan D Nguyen
(74) *Attorney, Agent, or Firm* — Shumaker & Sieffert, P.A.

(57) ABSTRACT

In general, techniques are described for adaptively applying network acceleration services within an intermediate network device. In particular, the intermediate network device comprises a classifier module that receives network traffic and a servicing engine. The servicing engine applies the network acceleration services to the network traffic in accordance with a service configuration and monitors the application of network acceleration services to determine whether the application of each of the network acceleration services improves the efficiency with which the network traffic is serviced. The servicing engine then dynamically adapts the service configuration to alter the application of the network acceleration services based on the determination. Thereafter, the servicing engine applies the network acceleration services to the network traffic in accordance with the dynamically adapted service configuration to more efficiently service the network traffic.

41 Claims, 5 Drawing Sheets

U.S. PATENT DOCUMENTS

2009/0092137 A1* 4/2009 Haigh et al. .................. 370/392

OTHER PUBLICATIONS

Co-pending U.S. Appl. No. 12/409,618, Kasturi et al. "Routing Protocol Extension for Network Acceleration Service-Aware Path Selection Within Computer Networks", filed Mar. 24, 2009.

Co-Pending U.S. Appl. No. 12/254,034, Kasturi et al. "Service Aware Path Selection With a Network Acceleration Device", filed Oct. 20, 2008.

Office Action for U.S. Appl. No. 12/254,034 dated May 10, 2010, 24 pp.

Response to Office Action for U.S. Appl. No. 12/254,034 dated Aug. 10, 2010, 24 pp.

Office Action from U.S. Appl. No. 12/254,034, dated Oct. 13, 2010, 23 pp.

Response to Office Action dated Oct. 13, 2010, from U.S. Appl. No. 12/254,034, filed Jan. 13, 2011, 18 pp.

* cited by examiner

ADAPTIVELY APPLYING NETWORK ACCELERATION SERVICES WITH AN INTERMEDIATE NETWORK DEVICE

TECHNICAL FIELD

The invention relates to computer networks and, more particular, communicating within computer networks.

BACKGROUND

In a typical network environment, client devices request and download content stored within network servers. Exemplary content includes web pages that may contain one or more of text, graphics, video, and sound data. Other examples of content include files, multimedia data streams (e.g., audio or video data streams), electronic messages, and data tables. Upon receiving the content requests, the network servers typically retrieve the requested content, break the requested content into packets, and transmit the packets to the requesting client device. Routers and other network infrastructure direct these packets through the network to the client devices, which, in turn, reconstruct the content from the packets and present the content to users via applications residing on the client devices.

The network may experience a variety of issues that result in decreased download speeds at the client devices. These issues include a large volume of content requests to a single network server that overload or otherwise diminish the capacity of the network server to timely service the requested content. Moreover, network congestion and limited network bandwidth may impact client download speeds. To increase download speeds and reduce bandwidth consumption, a network administrator may deploy one or more intermediate network devices, referred to as network acceleration devices, located between the client devices and the servers. These intermediate network devices may apply one or more network acceleration services to network traffic passing between the client devices and the servers in order to address the above listed issues or other issues that adversely affect download speeds.

For example, a network acceleration device may apply a compression service that compresses the network traffic according to one of a plurality of compression algorithms. Each of the plurality of compression algorithms may be tailored to a specific application, e.g., a HyperText Transfer Protocol (HTTP) application, or specific protocol and each may represent a particular service. Other network acceleration services may comprise application-specific acceleration techniques that may accelerate or optimize the retrieval of content. The network acceleration device may classify each packet flow of the network traffic as belonging to a particular application and/or protocol and apply the corresponding network acceleration services, e.g., compression algorithms or application-specific accelerations, to efficiently compress the content carried by the packet flows and/or optimize the retrieval of the requested content.

By compressing and optimizing the network traffic in this manner, the network acceleration devices may preserve bandwidth or reduce bandwidth consumption, thereby increasing the amount of traffic that may be transmitted over a given network. The increased capacity may reduce network congestion and, as a result, the network acceleration devices may increase downloads speeds as more data may be downloaded in a given amount of time when compared to networks that do not employ network acceleration devices.

SUMMARY

In general, the invention is directed to adaptive application of network acceleration services within an intermediate network device, such as a network acceleration device. As one example, the intermediate network device monitors the application of one or more network acceleration services to determine how effective each of the one or more services are in increasing the performance of the network. The intermediate network device may then dynamically adapt a static service configuration to improve the application of the one or more services. Thereafter, the intermediate network device may apply the services in accordance with the dynamically adapted service configuration rather than the static service configuration. In this manner, the intermediate network device may automatically adapt the application of the one or more network acceleration services to dynamically account for changing network conditions.

For example, an intermediate network device may comprise a classifier engine that stores an initial, statically-configured service configuration. This service configuration may be defined by an administrator or other user and maintain a plurality of associations between network acceleration services and an identifiable characteristic of the network traffic, such as a port number, protocol, application, destination Internet Protocol (IP) address, source IP address, and the like. When the intermediate network device intercepts network traffic, the classifier engine may classify each packet of the network traffic by parsing these identifiable characteristics from each packet. The classifier engine may then look up which network acceleration services apply to each packet using the parsed characteristics as a key into the service configuration.

The intermediate network device may further include a servicing engine that applies those network acceleration services identified by the classifier module. The servicing engine may further monitor the application of those network acceleration services and determine whether the application of network acceleration services improves the efficiency with which the network traffic is serviced. In some instances, the intermediate network device may be a compression device that maintains a cache of previously compress data strings for each application, and the servicing engine may monitor an internal cache-hit-to-miss ratio or a compression ratio over time with respect to each application and store such metrics in one or more internal tables. The servicing engine may then determine the efficacy on a relative basis of the compression techniques as applied to the different network applications by analyzing trends in each metric (e.g., cache-hit-to-miss ratio increasing). Based on this determination, the servicing engine may dynamically adapt the application of network acceleration services to the network traffic so as to improve the efficiency with which the network traffic is serviced. For example, the servicing engine may determine that the efficiency of certain network acceleration services are below a threshold and may dynamically elect to avoid application of those services to those network applications. Conversely, the servicing engine may determine that the efficiency of certain network acceleration services are above a threshold and may dynamically elect to expand the application of those services to network traffic sourced from or destined to additional portions of the network. Thereafter, the servicing engine may apply the network acceleration services in accordance with the dynamically adapted service configuration.

The techniques may provide one or more advantages. For example, by dynamically adapting the application of network acceleration services, the intermediate network device may improve the efficiency with which the network acceleration services are applied to network traffic within a particular network. In other words, the intermediate network device may reduce any wasted processor cycles and other internal device resources utilized when applying certain network acceleration services that may be considered ineffective (e.g., caching content when there is a low cache-hit-to-miss ratio). As another example, the intermediate network device may apply network acceleration services not previously configured to be applied to the network traffic or perhaps configured for limited traffic, and in this way the intermediate network device may thereby reduce bandwidth consumption within the network. In this respect, the intermediate network device may improve the efficiency with which the network traffic is processed by more efficiently utilizing bandwidth, which may be a key concern in such networks where links are leased or otherwise purchased.

In one embodiment, a method comprises receiving, with an intermediate network device, network traffic from a first network for delivery to a second network, applying, with the intermediate network device, a first set of at least two network acceleration services to the network traffic in accordance with a service configuration to improve efficiency with which the network traffic communicated, and monitoring, with the intermediate network device, the application of the first set of the network acceleration services to the network traffic to determine whether the application of each of the network acceleration service of the first set improves the efficiency with which the network traffic is communicated. The method also comprises, after monitoring the application of the first set of network acceleration services, dynamically adapting, with the intermediate network device, the service configuration to apply a second set of the plurality of network acceleration services to the network traffic based on the determination, wherein the first set and second set of network acceleration services differ in at least one of the network acceleration services. The method further comprises applying, with the intermediate network device, the second set of the network acceleration services to the network traffic in accordance with the dynamically adapted service configuration such that the network traffic is more efficiently communicated.

In another embodiment, an intermediate network device comprises a classifier module that receives network traffic from a first network for delivery to a second network, and a servicing engine. The servicing engine of the intermediate network device applies a first set of at least two network acceleration services to the network traffic in accordance with a service configuration to improve efficiency with which the network traffic communicated, and monitors the application of the first set of the network acceleration services to the network traffic to determine whether the application of each of the network acceleration service of the first set improves the efficiency with which the network traffic is communicated. The servicing engine further, after monitoring the application of the first set of network acceleration services, dynamically adapts the service configuration to apply a second set of the plurality of network acceleration services to the network traffic based on the determination, wherein the first set and second set of network acceleration services differ in at least one of the network acceleration services, and applies the second set of the network acceleration services to the network traffic in accordance with the dynamically adapted service configuration such that the network traffic is more efficiently communicated.

In another embodiment, a network system comprises a first network that includes a plurality of endpoint devices, and a second network that includes one or more devices that provide content. The network system, wherein the first network includes an intermediate network device comprising a classifier module that receives network traffic from one or more of the plurality of endpoint devices of the first network for delivery to the second network and a servicing engine. The servicing engine of the intermediate network device applies a first set of at least two network acceleration services to the network traffic in accordance with a service configuration to improve efficiency with which the network traffic communicated and monitors the application of the first set of the network acceleration services to the network traffic to determine whether the application of each of the network acceleration service of the first set improves the efficiency with which the network traffic is communicated. The servicing engine further, after monitoring the application of the first set of network acceleration services, dynamically adapts the service configuration to apply a second set of the plurality of network acceleration services to the network traffic based on the determination, wherein the first set and second set of network acceleration services differ in at least one of the network acceleration services, and applies the second set of the network acceleration services to the network traffic in accordance with the dynamically adapted service configuration such that the network traffic is more efficiently communicated.

In another embodiment, a computer-readable medium comprising instructions for causing a programmable processor to receive, with an intermediate network device, network traffic from a first network for delivery to a second network, apply, with the intermediate network device, a first set of at least two network acceleration services to the network traffic in accordance with a service configuration to improve efficiency with which the network traffic communicated, and monitor, with the intermediate network device, the application of the first set of the network acceleration services to the network traffic to determine whether the application of each of the network acceleration service of the first set improves the efficiency with which the network traffic is communicated. The instructions further cause the programmable processor to, after monitoring the application of the first set of network acceleration services, dynamically adapt, with the intermediate network device, the service configuration to apply a second set of the plurality of network acceleration services to the network traffic based on the determination, wherein the first set and second set of network acceleration services differ in at least one of the network acceleration services, and apply, with the intermediate network device, the second set of the network acceleration services to the network traffic in accordance with the dynamically adapted service configuration such that the network traffic is more efficiently communicated.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
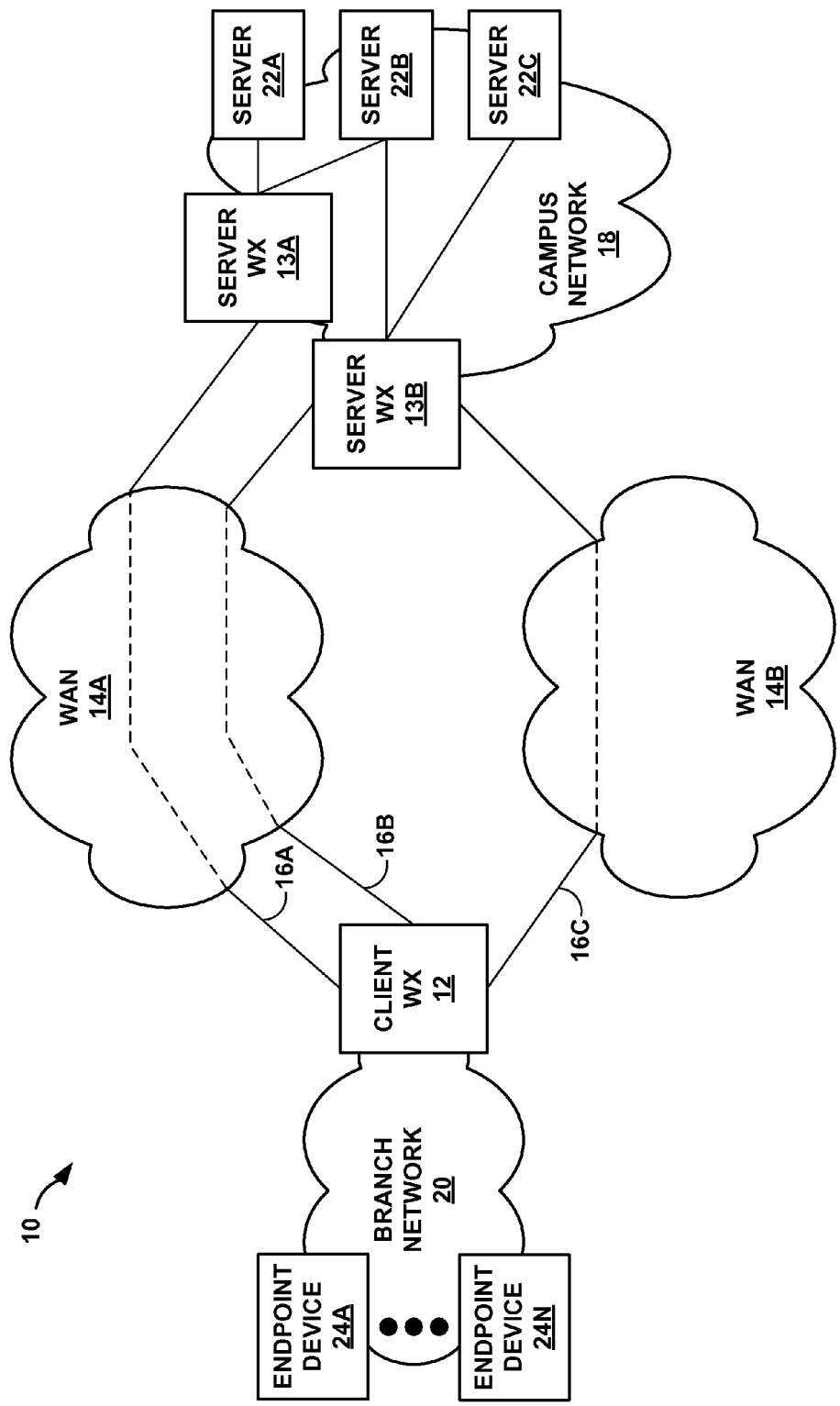
FIG. 1 is a block diagram illustrating an exemplary network system in which a client wide area network acceleration device (client WX device) adaptively applies network acceleration services in accordance with the techniques of the invention.

FIG. 1 is a block diagram illustrating an exemplary network system 10 in which a client wide area network acceleration device 12 adaptively applies network acceleration services in accordance with the techniques of the invention. While described in this disclosure with respect to a client Wide Area Network (WAN) acceleration (X) device 12 ("client WX 12"), the techniques may be implemented by any intermediate network device that applies network acceleration services to network traffic to accelerate such traffic or otherwise improve performance of network system 10. For example, the techniques could be applied by server WX 13A, 13B ("server WXs 13") instead of or in conjunction with client WX 12. Client WX 12 is referred to as a client acceleration device in that, in this example, it is located physically proximate to branch network 20 and endpoint devices 24A-24N. Similarly, server WXs 13 are referred to as server acceleration devices in that, in this example, they are located proximate to campus network 18 and servers 22A-22C.

Moreover, although shown in FIG. 1 as a separate, stand-alone or independent device, client WX 12 may be incorporated within any other network device, including a router, a switch, a hub, a firewall, and an intrusion detection/prevention (IDP) device. The techniques therefore should not be limited to a client WX but may be implemented by any intermediate network device. An intermediate network device may comprise any network device that resides between client or endpoint devices and servers or other network devices that store content, such as files, web pages, images, videos, data objects, etc.

As shown in FIG. 1, client WX 12 couples to a Wide Area Network 14A ("WAN 14A") via links 16A and 16B and WAN 14B via link 16C. WANs 14A, 14B ("WANs 14") may each comprise a public or private network that is available for lease or purchase by private entities or businesses so as to couple remote locations and/or networks together. For purposes of illustration, it is assumed that WAN 14A is owned and operated by one service provider, such as American Telephone and Telegraph (AT&T) Company, and WAN 14B is owned and operated by another service provider, such as Verizon Communications Inc.

Although not shown in FIG. 1 for ease of illustration purposes, WANs 14 may provide access to a public network, which may include any publicly accessible network, such as the Internet. Typically, the public network comprises a packet-based network that transmits packets according to an Internet Protocol (IP)/Transmission Control Protocol (TCP).

Client WX 12 resides at the edge of a remote or branch network 20. Likewise, each of server WXs 13 resides at the edge of an enterprise or campus network 18. Branch network 20 may represent a small network used by a remote location or office of a large enterprise or business. Branch network 20 may comprises a local area network (LAN) that operates according to one of the family of Institute of Electrical and Electronics Engineers (IEEE) 802.X Ethernet standards. Campus network 18 may represent a larger network used by the main office or location of the large enterprise or business. Campus network 18 may also comprise a LAN that operates according to one of the family of IEEE 802.X Ethernet standards. Typically, data and other resources, such as templates, documents, manuals, accounting figures, employee information, applications, and any other information or application pertinent to operation of both the remote and main offices of the large enterprise, are stored in a centralized location.

Campus network 18 also includes a plurality of servers 22A-22C ("servers 22"), which may each store in a centralized fashion the above described data, applications, and other resources. This data and other resources may be referred to herein generally as "content." Each of servers 22 may include one or more of a data server, a web server, an application server, a database, a computer cluster, a mainframe computer, or any other type of server, computing element, and/or database commonly employed by an enterprise or business to facilitate the operation of the enterprise or business. Each of servers 22 may support one or more of a variety of protocols or software interfaces, such as a HyperText Transfer Protocol (HTTP), a Common Internet File System (CIFS) protocol, a File Transfer Protocol (FTP), a Secure Socket Layer (SSL) protocol, a Messaging Application Programming Interface (MAPI), a Transmission Control Protocol (TCP), and a Session Initiation Protocol (SIP), by which these servers 22 may serve the content. Each of these servers 22 may comprise "blades" or other cards that are inserted into large racks. Commonly, these servers 22 may reside within a centralized data center. The racks may provide a common backplane or switch fabric to interconnect the various servers to campus network 18.

By connecting to campus network 18, servers 22 may be accessible by any devices included within campus network 18 and any devices, e.g., one or more of a plurality of endpoint devices 24A-24N ("endpoint devices 24"), of branch network 20. Each of endpoint devices 24 may comprise a laptop computer, a desktop computer, a workstation, a mainframe computer, a personal digital assistant (PDA), a cellular phone, a smart phone, or any other device capable of accessing a network. Campus network 18 may provide such a centralized location for the storage of data, applications, or other computing resources to reduce costs associated with distributed data storage.

Distributed data storage architectures typically required each location to maintain its own separate database or server for use in storing data pertinent to each respective location. For example, assuming, for purposes of illustration, that campus and branch networks 18 and 20 implemented distributed data storage, branch network 20 may also have included a remote data center, e.g., servers similar to servers 22, for storing data and other resources or content pertinent to the operation of the branch office. In this distributed data storage example, servers 22 would usually only store and serve content pertinent to the operation of campus network 18.

As network infrastructure lies in both of networks 18 and 20, the enterprise or business may be required to have dedicated Information Technology (IT) staff at both the remote location, e.g., the branch office, and the main location, e.g., the main office, to service both the remote and central data centers, which may increase expenses. Even if no dedicated IT staff is provided for servicing the remote data center, the enterprise may be required to send IT staff to the remote location, e.g., branch network 20, to service the remote servers, which may increase costs and otherwise impinge upon the operation of the branch office. Moreover, issues, e.g., data loss, may arise when the data and other resource or, more generally, the content of branch network 20 needs to be synchronized with content stored to servers 22 of the main office or campus.

Centralized storage of the content, however, reduces, if not eliminates many of these issues by placing all of the equipment necessary for data storage within a centralized location that is easily accessible by a dedicated and centrally located IT staff. Furthermore, as a result of next generation Internet network acceleration services and web development, centrally located servers 22 may serve web-based applications that enable remote users to access data and other resources stored to servers 22 through a web-browser executed by each of endpoint devices 24. Because only a web-browser is required, branch offices may no longer require dedicated IT staff on site. Moreover, because content may be deployed remotely, the IT staff need not travel to the remote office. Again, by virtue of centralizing the content, IT costs may be significantly reduced. As a result, centralized data centers, such as those in which servers 22 may each resides, are setting the standard by which large enterprises or businesses store and maintain data, as well as, remotely distribute new and update old applications.

While centralized storage of content may decrease costs, this centralized architecture typically requires that branch network 20 maintain access to campus network 18. Commonly, large enterprises or businesses may lease or purchase a dedicated line or connection that couples branch network 20 and campus network 18 together to ensure privacy or otherwise prevent unauthorized access to networks 18 and 20. A network service provider may lease or sell this line to the enterprise or business and usually charges various prices depending on the speed and/or bandwidth of the line. For example, a service provider may offer for lease a digital signal 1 ("DS1") or T-carrier 1 ("T1") line (e.g., a dedicated line having 1.536 mega-bits per second of bandwidth) for a first price per month and a DS3 or T3 line (e.g., a dedicated line having 44.736 mega-bits per second of bandwidth) for a second, higher price per month. Depending on the bandwidth required between branch network 20 and campus network 18, the enterprise or business may choose either to purchase one or more of either or both the T1 or T3 line.

For purposes of illustration, it is assumed that links 16A-16C ("links 16") are leased or purchased from one or more network service providers that own and operate WANs 14, e.g., the above mentioned AT&T and Verizon. Notably, the term "link" may used herein to refer to the physical connection (such as the cables or other communications mediums running between one or more central offices of WANs 14 and networks 18, 20), while "line" refers to a service (such as a T1 line or T3 line) carried by the link. Often, however, the terms are used interchangeably as a T1 or T3 line generally accompanies the leasing of one or more links. That is, a customer may request a T1 line service and, as part of that service, the service provider leases a dedicated link to the customer as part of providing the T1 line service. As a result, links 16 may also be referred to herein as "lines 16."

Considering that bandwidth concerns may, in part, control the selection of lines, the business or enterprise may attempt to reduce the bandwidth required between branch network 20 and campus network 18 in order to, again, reduce costs by enabling the enterprise to subscribe to a line that provides (and lease a link capable of supporting) less bandwidth. To this end, branch network 20 and campus network 18 may include one or more respective intermediate network devices, e.g., client WX 12 and server WXs 13, to reduce bandwidth consumption through application of one or more network acceleration services to traffic traversing WANs 14.

Network acceleration services may include any action by client WX 12 and server WXs 13 to improve performance of network system 10, e.g., by reducing bandwidth consumption and thereby increasing available bandwidth. In other words, network acceleration services may include, for example, caching of content, compressing packets or other discrete data units of the network traffic, application acceleration, or any combination of the above, as well as, any other action that improves network performance. Example data compression network acceleration techniques are described in U.S. Pat. No. 7,167,593, entitled "SYSTEM AND METHOD FOR INCREMENTAL AND CONTINUOUS DATA COMPRESSION", issued Jan. 23, 2007, incorporated herein by reference.

These intermediate network devices, e.g., client WX 12 and server WXs 13, may represent proxy devices that divide each TCP or other protocol sessions into three discreet TCP session: (1) a first TCP session having terminations at an endpoint device 24 and client WX 12, (2) a second TCP session having terminations at client WX 12 and one of server WXs 13, and (3) a third TCP session having terminations at one of server WXs 13 and one of servers 22. In this respect, client WX 12 and server WXs 13 may represent TCP proxies that apply network acceleration services to the second or intermediate TCP session. That is, endpoint device 24A may intend to establish a single TCP session with a particular destination, e.g., server 22A, by which to access content stored to that destination. Client WX 12 may intercept this TCP session request and reply to the session as if client WX 12 was the intended destination, thereby establishing the first TCP session of the three.

Client WX 12 may then establish a second or intermediate TCP session with either of server WXs 13 depending on whether those server WXs 13 couple to the intended or particular destination. For example, assuming server 22A is the intended destination, client WX 12 may establish a second TCP session with server WX 13A, as server WX 13A is the only intermediate server WX that connects to server 22A. This server WX 13A may then establish a third TCP session with server 22A. As a separate TCP session exits between client WX 12 and server WX 13A, these client and server WXs 12 and 13A may apply network acceleration services to traffic destined for and received from the particular or intended destination server 22A without interfering with the first and second TCP sessions.

The intermediate network device, e.g., client WX 12, may, for example, locally cache content previously requested by a client device, such as one or more of endpoint devices 24, in order to reduce if not eliminate bandwidth consumption directed to subsequent requests for the same data. That is, client WX 12 may, instead of issuing the request for the same content previously requested and thereby consuming bandwidth, cache the previously requested content and, without sending the request to servers 22 or the public network, service the request using the locally cached content, thereby preserving bandwidth.

The intermediate network devices, e.g., client WX 12 and server WXs 13, may also communicate with one another via the second TCP session so as to compress traffic, and thereby reduce bandwidth consumption, by replacing identified sequences of data with, for example, symbols, where the symbols represent the respective identified sequences using fewer bits. Client WX 12 may, for example, apply a compression service that compresses the network traffic according to one of a plurality of compression algorithms. Each of the plurality of compression algorithms may be tailored to a specific application, e.g., a HyperText Transfer Protocol (HTTP) application, or specific protocol and each may represent a particular compression service.

Client WX 12 may also apply an application-specific acceleration service having a particular algorithm designed to accelerate or optimize the retrieval of content for a specific network application. For example, an HTTP acceleration service may enable more efficient retrieval of HyperText Markup Language (HTML) pages. Typically, each HTML page comprises a plurality of objects, e.g., images, templates, Java Scripts, etc., and client WX 12 may apply an HTTP acceleration service to each HTML request to more efficiently download the plurality of objects, thereby "accelerating" the retrieval of HTML pages requested via HTTP.

To determine an application to which each packet belongs, intermediate network devices 12, 13 may classify each packet of the network traffic as belonging to a particular application and/or protocol and apply one or more corresponding network acceleration services (e.g., caching, compression, or application-specific acceleration) to improve network performance. In this manner, client WXs 12, 13 may apply network acceleration services to improve the performance of network system 10.

In accordance with the techniques described herein, one or more of client WX 12 and server WXs 13 may adaptively apply network acceleration services to more efficiently, in terms of both the consumption of resources of devices 12, 13 and bandwidth of links 16, apply these network acceleration services. For example, client WX 12 may initially receive network traffic from a first network, e.g., branch network 20, requesting content stored within a second network, e.g., campus network 18. Typically, client WX 12 receives the network traffic from one or more of endpoint devices 24. The network traffic may comprise a plurality of packets, where one or more of the packets request content stored to, for example, servers 22 of campus network 18. Client WX 12 may next apply at least one of the above described network acceleration services in accordance with a service configuration to the network traffic to improve the efficiency with which the network traffic is serviced or processed.

The service configuration may comprise a configuration associating one or more network acceleration services with a particular Internet Protocol (IP) port, protocol, application, destination, carrier (e.g., one of links 16) or any other characteristic of a packet or other discrete data unit of the network traffic or network. An administrator or other user may define the service configuration and, in doing so, tailor the service configuration to meet particular needs of network system 10. That is, an administrator may tailor the service configuration to apply two or more network acceleration services for a particular type of network traffic, e.g., HTTP traffic, because this particular type of traffic, e.g., HTTP traffic, constitutes a large percentage of the network traffic traveling between branch network 20 and campus network 18. The administrator may also tailor service configuration to apply no network acceleration services to another type of network traffic, e.g., FTP traffic, as this other type of network traffic, e.g., FTP traffic, may constitute a relatively small or minor percentage of the network traffic. In this manner, the administrator may statically configure or provision the application of network acceleration services within client WX 12.

The administrator may however not fully understand or otherwise be able to constantly monitor and predict the efficacy of the statically provisioned application of network acceleration services and may further configure client WX 12 in accordance with the techniques described herein to monitor the application of the at least one of a plurality of network acceleration services to the network traffic. Client WX 12 may, in response to this configuration, monitor the application of these network acceleration services to determine whether any of the at least one service results in an improvement of the efficiency with which the network traffic is processed. That is, client WX 12 may determine whether the network acceleration services currently applied to the network traffic are actually improving the performance of network system 10 by, for example, adequately reducing bandwidth consumption. Due to the complex algorithms that may be applied for a network acceleration service, any ineffective network acceleration services may actually delay the delivery of network traffic and needlessly consume resources, e.g., processor cycles and/or memory, of client WX 12, as well as, fail to adequately address bandwidth, download speed and other network concerns.

Client WX 12 may monitor the efficacy or benefits of a particular service in one or more ways. Client WX 12 may monitor application of the network acceleration services with respect to a particular client or endpoint device 24, a particular destination or server 22, a particular link 16 (or carrier/service provider that operates WANs 14) and a particular adjacent intermediate network device, such as server WX 13A. Client WX 12 may quantize this monitoring using a number of metrics and store these metrics within a table corresponding to the above four categories, e.g., a clients table, a destinations table, a links or carrier table, and an adjacency table. While described with respect to four tables, the techniques described herein may store the metrics in any number of tables divided according to any conceivable categorization. Also, these tables may be combined into a single interrelated table or stored in more than four tables.

For example, client WX 12 may monitor the efficacy of a cache service by monitoring a ratio of cache hits to cache misses for a particular application, flow, session, protocol or any other classification. Client WX 12 may store this cache hits-to-miss ratio in the clients table within a client entry associated with the particular client requesting the content. Client WX 12 may monitor the efficacy of a compression service by monitoring a packet size, for example, pre- and post-compression and calculating a percentage of compression based on these pre- and post-compression sizes. Client WX 12 may store this information within the client table in a client entry corresponding to the client or one of endpoint devices 24 from which the packet was received. Client WX 12 may also monitor the efficacy of an acceleration service by monitoring the amount of time, e.g., a so-called "response time," to process a given request from one of endpoint devices 24 for content. Again, client WX 12 may store this metric within the client table in a client entry corresponding to the one of endpoint devices 24 from which the packet was received.

While described with respect to the particular service type (e.g., caching, compression and acceleration), the above metrics (e.g., cache hit to miss ratio, compression percentage and response time) may be applied to monitor any one of the above service types and/or may be combined to monitor a single service type. When two or more network acceleration services are combined and applied to a particular packet, the efficacy of each service may be monitored and combined to determine a single efficacy of the application of the two or more network acceleration services.

Client WX 12 may also monitor the efficacy of network acceleration services by monitoring patterns within the network traffic generated by particular client or endpoint devices 24. For example, client WX 12 may determine that network traffic originating from endpoint device 24A generate large amounts of HTTP traffic whose content length is generally less than 1000 bytes. Client WX 12 may, to monitor such efficacy, maintain threshold or other data or information relevant to each of the plurality of network acceleration services and determine, by comparing the service specific information to each traffic pattern, that one or more of the plurality of network acceleration services are not suitable for traffic having the determined pattern or characteristic, e.g., 1000 byte maximum length. Client WX 12 may, therefore, perform some form of "deep packet inspection" to determine these characteristics, which may include an application type, a content length, a length of message or packet, a port number or other deep packet inspection properties. These properties or characteristics are referred to as "deep" in that these properties involve more than a cursory packet header inspection. Client WX 12 may store this information within a client entry of the client table corresponding to the client device for which the traffic pattern was determined.

Client WX 12 may also monitor the efficacy of the application of network acceleration services by monitoring a time required by each of servers 22 to respond to requests issued from endpoint devices 24. In this manner, client WX 12 may determine a "sluggishness" of servers 22 that may represent an overall delay of servers 22 to respond to requests. For example, client WX 12 may monitor the number of connection dropped by a particular destination over a set amount of time and update, within the destination table, the number of dropped connections of a destination entry corresponding to the monitored destination of the destination table.

Client WX 12 may further monitor the above application of network acceleration services as applied to a particular line or link 16. Thus, client WX 12 may determine the efficacy of network acceleration services based on monitored link characteristics. In this respect, client WX 12 may apply network acceleration services on a per connection basis in that client WX 12 may apply certain network acceleration services for traffic forwarded via each of links 16A, 16B and 16C depending on one of or both server WXs 13 capabilities and/or characteristics of links 16. Client WX 12 may store this information to an entry of the carrier or link table corresponding to the link for which the characteristics were determined.

Client WX 12 may, in some instances, monitor the efficacy of the network acceleration services by monitoring a performance of adjacent intermediate network devices, e.g., one or more of server WXs 13. Client WX 12 may monitor these adjacent server WXs 13 and learn of the efficacy or performance of network acceleration services as applied by each of server WXs 13, for example. Client WX 12 may also determine that one of server WXs 13 provide a plurality of network acceleration services while the other one of server WXs 13 apply only some or a smaller subset of the plurality of network acceleration services. Client WX 12 may store this information to an adjacency entry in the adjacency table corresponding to the particular adjacent one of server WXs 13 for which the information was learned.

Client WX 12 may include one or more of the above tables to maintain records of each of the above metrics on a per flow basis over a period of time. While described herein as storing this data on a per flow or connection basis, client WX 12 may store this information on a per session, application, protocol, or any other discrete classification basis over a period of time. In other words, client WX 12 may maintain a data structure to preserve a historical accounting of each of the above metrics on any applicable basis.

Next, client WX 12 may analyze these historical tables to determine the efficacy of each service as applied to a particular flow or connection. For example, client WX 12 may, upon receiving a packet from a particular one of endpoint devices 24 and destined for a particular destination, e.g., server 22A, determine the efficacy of network acceleration services applied for that particular one of endpoint devices 24 and server 22A by accessing a client and destination entry of the client and destination tables respectively corresponding to that one of endpoint devices 24 and server 22A. Client WX 12 may evaluate, analyze or otherwise service or process these entries to determine the efficacy of the network acceleration services in the past. Based on this determination, client WX 12 may dynamically adapt the service configuration to alter the application of the at least one service to the network traffic.

To adapt the network acceleration services, client WX 12 may, for example, remove one or more network acceleration services that were previously being applied for that particular client or destination. More particularly, client WX 12 may, again for example, determine that the cache hit-to-miss ratio for a particular flow has decreased over time and remove from the service configuration the caching service for that particular flow. As a further example, client WX 12 may, based on information received from another intermediate network device, e.g., server WX 13A, determine that a particular service being applied by server WX 13A is ineffective when applied to content received from server 22A. Client WX 12A may then remove that service within the service configuration for a flow of the network traffic associated with server 22A.

As another example, client WX 12 may maintain historical records that identify the "sluggishness" of one of servers 22. Based on this sluggishness measure, e.g., a time to respond to a request, client WX 12 may add network acceleration services, such as acceleration network acceleration services, to compensate for this "sluggishness." If the sluggishness is measured by the number of dropped connections, client WX 12 may, instead of adding network acceleration services, remove network acceleration services as these would be a waste of the resources of client WX 12 considering that the connection is likely to be dropped. As yet another example, based on traffic patterns, client WX 12A may dynamically adapt the application of network acceleration services by altering the service configuration to apply certain types of compression network acceleration services to traffic having a monitored maximum length pattern, for example, of one size.

With respect to the connection based historical records, client WX 12 may identify particular adjacent intermediate devices 13 that can reach the same content. In FIG. 1, for example, both of server WXs 13 may access or connect to server 22B. Client WX 12 may determine this joint access by server WXs 13 and then determine, for example, which network acceleration services and the number of connections each of server WXs 13 support. Client WX 12 may then adapt the service configuration to direct packets requesting content from server 22B to one of these server WXs 13 over the other one of server WXs 13 based on this monitored connection information.

After adapting the application of network acceleration services by way of editing or overriding the service configuration, client WX 12 may apply the plurality of network acceleration services to the network traffic in accordance with the dynamically adapted service configuration. In some embodiments, client WX 12 may apply the plurality of network acceleration services by not applying the one of the plurality of network acceleration services to a particular flow. By dynamically adapting the application of network acceleration services when such network acceleration services may be ineffectively applied, client WX 12 may avoid unnecessary application of network acceleration services that provide little benefit.

As a result, client WX 12 may automatically and dynamically tailor the application of network acceleration services to meet particular circumstances of network system 10. Moreover, client WX 12 may not needlessly consume resources of client WX 12, e.g., processor cycles and memory, by applying network acceleration services that have little if any benefit. This may reduce latency and improve client WX 12's throughput with respect to processing network traffic, especially when compared to statically configured or provisioned intermediate network devices.

Figure 2:
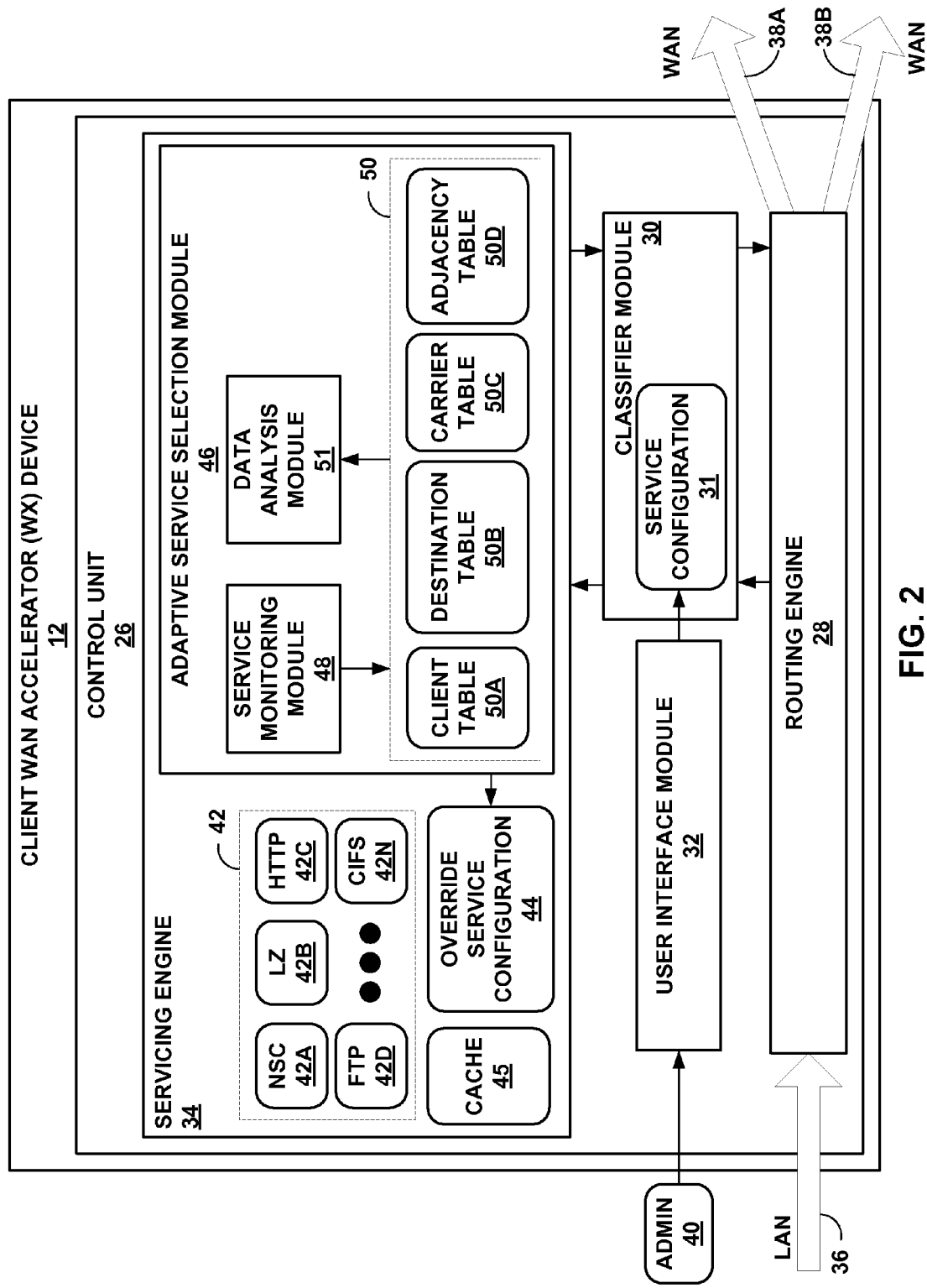
FIG. 2 is a block diagram illustrating an example embodiment of the client WX device of FIG. 1 in more detail.

FIG. 2 is a block diagram illustrating client WX device 12 of FIG. 1 in more detail. As shown in FIG. 2, client WX 12 includes a control unit 26. Control unit 26 may include one or more processors (not shown in FIG. 2) that execute software instructions stored to a computer-readable storage medium (not shown in FIG. 2), such as a disk drive, optical drive, Flash memory or any other type of volatile or non-volatile memory, that cause a programmable processor, such as control unit 26, to perform the techniques described herein. In some embodiments, control unit 26 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 26 may include a routing engine module 28 ("routing engine 28"), a classifier module 30, a user interface module 32 and a servicing engine module 34 ("servicing engine 34"). Routing engine 28 represents a module comprising hardware and/or software to receive incoming large area network (LAN) traffic 36 from branch network 30 via one or more interfaces (not shown in FIG. 2), processor or otherwise route LAN traffic 36 and forward LAN traffic 36 via one or more of the plurality of interfaces to either of WANs 14 as WAN traffic 38A, 38B. It is assumed for purposes of illustration that WAN traffic 38A is forwarded to WAN 14A via one of links 16A, 16B and WAN traffic 38B is forward to WAN 14B via link 16C.

Classifier module 30 represents a module comprising hardware and/or software to receive packets from a network, such as branch network 20, and classify those packets based on information contained within a header, a payload, or both the header and the payload of the packet. Classifier module 30 may determine, based on this information, to which of a plurality of flows, session, connection and/or application each of LAN packets 36 corresponds.

Classifier module 30 may determine to which flow a particular one of LAN packets 36 corresponds by extracting information referred to as a "five-tuple" from each packet. Each flow represents a flow of packets in one direction within the network traffic. A five-tuple comprises a source Internet Protocol (IP) address, a destination IP address, a source port, a destination port, and a protocol. Typically, the five-tuple is found within the header of each of LAN packets 36 and classifier module 30 may parse or otherwise extract the five-tuple from the header of each of LAN packets 36 to identify to which flow each of LAN packets 36 corresponds. Classifier module 30 may also extract and utilize additional information to identify a flow, such as a source media access control ("MAC") address and a destination MAC address.

Classifier module 30 may also, based on this information, identify an application-specific protocol or application to which each of LAN packets 36 corresponds. Classifier module 30 may, for example, determine, based on a source port of the five-tuple, whether each of packets 36 corresponds to an HTTP application, e.g., a web browser.

Classifier module 30 may maintain service configuration 31, where service configuration 31 represents data, rules or other information that defines associations among network acceleration services, such as the below described servers 42, and a flow, a session, a connection, an application, a protocol, a port or other classifiable characteristic of network traffic 36. In this respect, service configuration 31 may comprise one or more rules that define associations between network acceleration services 42 and one or more identifiable characteristic of network traffic 36, such as a port number. Service configuration 31 may represent the above described static configuration. Service configuration 31 may also store the configuration that enables servicing engine 34 to apply the adaptive service application techniques described herein.

User interface module 32 represents a module that presents one or more user interfaces by which an administrator, such as administrator 40 ("admin 40"), may interact to configure client WAN 12. Servicing engine 34 represents a module for processing or servicing LAN packets 36. Processing, in the context of client WX 12, refers to servicing LAN packets 36 by responding to each of LAN packets 36 with an appropriate response. For example, one of LAN packets 36 may request content from campus network 20, and servicing engine 34 may process this packet by retrieving this content from a memory local to client WX 12, e.g., a cache 45, or directly from campus network 20 and responding to the packet with the retrieved content. Servicing of a packet may also refer to servicing engine 34 compressing the packet such that the compressed version of the packet may be sent to one of server WXs 13 to reduce the consumption of bandwidth over links 16 and WANs 14. Servicing may also refer to the above described application acceleration. Servicing of a packet may therefore generally refer to the application of one or more network acceleration services to LAN traffic 36.

Servicing engine 34 includes a plurality of network acceleration services 42A-42N ("network acceleration services 42"), a override service configuration 44, a cache 45 and an adaptive service selection module 46. Network acceleration services 42 include a number of different network acceleration services, such as Non-uniform Spectral Compression (NSC) service 42A ("NSC 42A"), a Lempel-Ziv (LZ) compression service 42B ("LZ 42B"), a HyperText Transfer Protocol (HTTP) acceleration service 42C ("HTTP 42C"), a File Transfer Protocol (FTP) acceleration service 42D ("FTP 42D"), and a Common Internet File System (CIFS) acceleration service ("CIFS 42N").

Service configuration 44 represents data or other information, e.g., a configuration file, table or other data structure, that defines associations among network acceleration services 42 and a flow, a session, a connection, an application, a protocol, a port or other classification type of network traffic 36 that override or refine the corresponding associations, in whole or in part, defined by service configuration 31. In this respect, override service configuration 44 may comprise one or more override rules that define associations between network acceleration services 42 and one or more identifiable characteristics, such as a port number, that override the similar configuration in whole or in part defined by service configuration 31. Cache 45 represents one or more memories, either static or dynamic, that stores content retrieved from remote locations. Cache 45 may be employed by servicing engine 34 to provide the above described caching service. Service configuration 31 and override service configuration 44 may identify which flow, session, connection, application, protocol or other classification type of network traffic 36 for which servicing engine 34 caches data to cache 45.

Adaptive service selection module 46 represents a module for implementing, at least in part, the adaptive aspect of the techniques described herein. That is, adaptive service selection module 46 may represent a module that dynamically adapts the application of network acceleration services 42 by updating service configuration 31 by altering override service configuration 44 in response to a monitored efficacy of each of network acceleration services 42 as applied to network traffic 36. To this end, adaptive service selection module 46 may include a service monitoring module 48, a service monitoring module 48, a plurality of tables 50A-50D ("tables 50") and data analysis module 51.

Service monitoring module 48 may monitor an efficacy for each of the plurality of network acceleration services 42 in the manner described below in more detail. Tables 50 may comprise a client table 50A, a destination table 50B, a carrier table 50C and an adjacency table 50D for storing data or other information concerning the monitored efficacy of each of the plurality of network acceleration services 42. Data analysis module 51 may determine the efficacy of the application of the plurality of network acceleration services 42 to packets of network traffic 36.

Initially, admin 40 may interact with a user interface presented by user interface module 32 to configure client WX 12. Admin 40 may provide input via the user interface to define service configuration 44 and thereafter update, alter, or otherwise edit service configuration 31. Admin 40 may, for example, input an association via a user interface presented by user interface module 40 that associates HTTP acceleration service 42C with a particular port, e.g., port 80. User interface module 40 may receive this input and update service configuration 31 according to the input. In this manner, admin 40 may interact with user interface module 32 to define service configuration 31.

Typically, as admin 40 need interact with client WX 12 to define service configuration 31 and this configuration 31 remains unchanged until the next admin 40 interaction. As a result, this type of configuration may be referred to as a "static" configuration. Statically configured service configuration 31 may apply regardless of the efficacy of the application of network acceleration services 42 to LAN traffic 36. Often such manual or static configuration may result in the above described inefficiencies. To overcome these inefficiencies, admin 40 via interactions with the same or another user interface presented by user interface module 32 may enable dynamic or adaptive application of the plurality of network acceleration services 42, which may override in whole or in part the original, or static, service configuration 31. That is, for a particular association or for one or more associations, including all of the current associations, of service configuration 31, admin 40 may define a rule to apply network acceleration services 42 on a "best effort" basis, thereby enabling dynamic application of those associated network acceleration services 42. Once enabled, client WX 12 may implement the dynamic service application techniques described herein with respect to the identified associations.

For example, routing engine 28 may receive LAN traffic 36 via one or more of the plurality of interfaces, whereupon routing engine 28 may forward LAN traffic 36 to classifier module 30. Classifier module 30 may classify each packet of LAN traffic 36 by identifying to which flow, session, connection, application, protocol, and/or other identifiable classification type each packet of LAN traffic 36 corresponds. Classifier module 30 may employ one or more protocol and/or application specific modules to identify particular applications or protocols.

Classifier module 30 may then perform a lookup of service configuration 31 using one or more of the identified characteristics (or so-called "classification information") as a key to determine whether any rules exists with respect to that packet within service configuration 31. If no rule exists and wholesale dynamic service application has not been enabled (e.g., a system-wide configuration option that enables dynamic application of network acceleration services 42), classifier module 30 may return that packet back to routing engine 28 for forwarding via one of links 16. If a rule exists, including the best effort rule that enables the dynamic application of network acceleration services 42, classifier module 30 may forward each classified packet, as well as, the identifying information and the corresponding one or more rules, including the best effort rule, to servicing engine 34.

Servicing engine 34 may receive each packet, the identifying information and the rules and apply those network acceleration services 42 identified by the corresponding rules. After servicing each packet of LAN traffic 36, servicing engine 34 may forward the packet to classifier module 30, which in turn forwards each packet to routing engine 28. Routing engine 28 may then forward each packet via the plurality of interfaces to either of WANs 14 as respective WAN traffic 38A, 38B ("WAN traffic 38").

Throughout or simultaneous to the application of network acceleration services 42, service monitoring module 48 monitors the efficacy of those network acceleration services 42 applied to LAN traffic 36. Service monitoring module 48 may monitor the efficacy of those network acceleration services 42 for which the above described best effort rule was defined by admin 30. As described above, service monitoring module 48 may monitor the efficacy of applying those network acceleration services 42 with respect to clients, destination, links and adjacent intermediate network devices.

For example, service monitoring module 48 may monitor the efficacy of applying network acceleration services 42 with respect to a particular client in a number of ways. Service monitoring module 48 may, in some instances, monitor a caching service as applied to a particular one of client or endpoint devices 24 by monitoring a cache hit-to-miss ratio for packets originating from a particular client that request content. Service monitoring module 48 may also monitor the above described compression ratio of each packet originating from a particular client or endpoint device 24 and/or a response time to process each packet for a particular client or endpoint device 24.

Service monitoring module 48 may also monitor the efficacy of applying network acceleration services 42 with respect to a particular destination in a number of ways. Service monitoring module 48 may, in some instances, monitor the efficacy of applying network acceleration services 42 to content served by a particular destination, such as one of servers 22. That is, often compressing packet headers where data is frequently reused is highly effective, but compressing the actual payload or content data may result in a poor compression ratio, as this content is dynamic or changes frequently. Because dynamic data, such as frequently updated web or HTTP pages, may require rebuilding the dictionary of symbols used to compress the payload, compressing packets used to convey this dynamic data may result in high levels of resource utilization for little if any bandwidth savings. Service monitoring module 48 may therefore monitor the compression ratio of packets received from a particular destination.

Service monitoring module 48 may also monitor the above described sluggishness of each destination by monitoring a time to respond to each packet sent to that destination, or better stated, a time between sending a packet requesting content and receiving a response packet that includes the requested content. Service monitoring module 48 may also monitor the number of connections, e.g., TCP session, dropped by a particular destination.

Service monitoring module 48 may further monitor the efficacy of applying network acceleration services 42 with respect to a particular link or carrier. For example, service monitoring module 48 may monitor the throughput of each of links 16A-16C by monitoring the number of packets transmitted over each of those links 16A-16C over a set period of time. Based on throughput, service monitoring module 48 may also determine saturation or other derivative or throughput, such as bandwidth consumption, as well. Service monitoring module 38 may monitor each link leased by the same carrier, such as links 16A and 16B, and sum the monitored metrics to reflect a particular carrier.

In some respects, service monitoring module 48 may also determine a cost associated with transmitting data via each of links 16. In this instance, the network service providers may charge for use of links 16 based on the amount of data sent over links 16 or charges for overrunning a set amount of bandwidth consumption. Service monitoring module 48 may, for example, be configured with or retrieve from one of tables 50, e.g., carrier table 50C, this data rate, e.g., a price per unit of data transmitted, and calculate the a cost per link or carrier based not only on this rate.

Additionally, service monitoring module 48 may monitor the efficacy of applying network acceleration services 42 with respect to adjacent intermediate network devices. That is, service monitoring module 48 may also communicate with other intermediate network devices to which client WX 12 couples to apply certain network acceleration services, e.g., so-called "adjacent" intermediate network devices. That is, some network acceleration services, such as compression network acceleration services, require the cooperation of both client WX 12 and another intermediate network device, such as server WX 13A. In considering compression network acceleration services, for example, client WX 12 may use a dictionary that maps symbols to data patterns or particular patterns of data bits. The symbols may represent the pattern of bits using less bits and thereby compress a given portion of data. However, server WX 13A typically maintains a similar database of symbols, or dictionary, to decompress the portion of data. Thus, client WX 12 may maintain connections with adjacent server WXs 13 to provide these joint network acceleration services.

Service monitoring module 48 may also determine destination, e.g., servers 22, serviced by each of server WXs 13. That is, service monitoring module 48 may, for example, determine that both of server WXs 13 service packets destined for server 22B. Service monitoring module 49, based on this determination, may begin monitoring the network acceleration services provided by each of adjacent intermediate network devices, e.g., service WXs 13A, 13B, to determine the best link or connection by which to reach server 22B. Service monitoring module 48 may also evaluate the connection by determining which network acceleration services each of server WXs 13 support.

During negotiation of the connection, client WX 12 and, more particularly, service monitoring module 48 may learn of the network acceleration services provided by each adjacent intermediate network device, e.g., server WXs 13, in order to establish which network acceleration services client WX 12 and those adjacent intermediate network devices, e.g., server WXs 13, may apply. Service monitoring module 48 may after negotiating these network acceleration services requiring such cooperation also receive updates to the dictionary or other databases or information used to apply these cooperative network acceleration services. In this manner, service monitoring module 48 may monitor the application of network acceleration services provided by adjacent intermediate network devices, e.g., server WXs 13.

Service monitoring module 48 may store the above monitored metrics or results to one or more of tables 50. Typically, service monitoring module 48 stores the metrics as a function of time, and therefore each entry of each of tables 50 may store a historical data describing each metric at an instance in time. Therefore, tables 50 may, in some instances, store historical data pertaining to the application of the plurality of network acceleration services 42 to LAN traffic 36 over time.

Client table 50A may for example comprise a client entry that stores historical information for each of endpoint devices 24 for which client WX 12 previously received a packet. Each client entry may be associated with a source Internet Protocol (IP) address assigned to each of endpoint devices 24 and store the above described metrics monitored on a per client or endpoint device basis. The following Table 1 illustrates an exemplary configuration of a client table 50A:

TABLE 1

| Client | Cache Hit-to-Miss (%) | Compression Ratio (%) | Response Time (ms) |
| --- | --- | --- | --- |
| 192.168.100.1 | 90.76 | 13.55 | 13 |
|  | 81.45 | 16.14 | 10.3 |
| 192.168.100.8 | 14.35 | N/A | N/A |
|  | 29.45 | N/A | N/A |

As shown above, the first client assigned IP address 192.168.100.1 has a single client entry storing historical data related to three metrics, e.g., cache hit-to-miss ratio, compression ratio and response time. For each category of metric, two historical data points have been stored. For example, a cache hit-to-miss ratio has decreased from 90.76% to 81.45%, a compression ratio metric has increased from 13.55% to 16.14% and a response time has decreased from 13 milliseconds (ms) to 10.3 ms.

For the client assigned IP address 192.168.100.8, only one metric was evaluated, e.g., cache hit-to-miss ratio, at two instances in time, showing an increase in cache hit-to-miss ration from 14.35% to 29.45%. The above Table 1 is illustrative of one exemplary embodiment of a client table 50A and should not be construed as limiting to the techniques described herein. Moreover, for ease of illustration purposes, Table 1 is shown above in simplified form and may comprise any number of metrics related to any of the above described metrics monitored on a per client or endpoint device, such as endpoint devices 24, basis.

Destination table 50B may for example comprise a destination entry that stores historical information for each of servers 22 for which client WX 12 previously received a packet. Each destination entry may be associated with an Internet Protocol (IP) address assigned to each of servers 22 and store the above described metrics monitored on a per destination basis. The following Table 2 illustrates an exemplary configuration of a destination table 50B:

TABLE 2

| Destination | Connections Dropped | Compression Ratio (%) | Response Time (ms) |
| --- | --- | --- | --- |
| 192.188.111.1 | 10 | 55.45% | 39 ms |
|  | 39 | 59.95% | 37 ms |
| 192.188.111.2 | 14 | N/A | N/A |
|  | 3 | N/A | N/A |

As shown above, the first destination assigned IP address 192.188.111.2 has a single destination entry storing historical data related to three metrics, e.g., connection dropped, compression ratio and response time. For each category of metric, two historical data points have been stored. For example, a connections dropped metric has increased from 10 to 39, the compression ratio has increased from 55.45% to 59.95% and the response time has decreased from 39 milliseconds (ms) to 37 ms.

For the destination assigned IP address 192.188.111.2, only one metric was evaluated, e.g., connections dropped, at two instances in time, showing a decrease in connections dropped from 14 to 3. The above Table 2 is illustrative of one exemplary embodiment of a destination table 50B and should not be construed as limiting to the techniques described herein. Moreover, for ease of illustration purposes, Table 2 is shown above in simplified form and may comprise any number of metrics related to any of the above described metrics monitored on a per destination, e.g., server 22, basis.

Carrier table 50C may for example comprise a carrier entry that stores historical information for each of carrier, e.g., WANs 14, (or links, such as links 16) through which client WX 12 transmits traffic. Each carrier (or link) entry may be associated with a particular interface of client WX 12 (not shown in FIG. 2) used to interface with a particular one of links 16 and store the above described metrics monitored on a per carrier or link basis. The following Table 3 illustrates an exemplary configuration of a carrier table 50C:

TABLE 3

| Carrier | Throughput (packets/ms) | Available Bandwidth (GB) |
| --- | --- | --- |
| Interface 1 | 1002 | 0.432 |
| Interface 2 | 2453 | 0.841 |
| Interface 3 | 2344 | 0.902 |

As shown above, the first interface, e.g., Interface 1, has a single destination entry storing historical data related to two metrics, e.g., throughput and available bandwidth. As interfaces may couple to a single link, each interface represents a link. One or more of interfaces may be summed to determine per carrier metrics. For each category of metric, one historical data point has been stored. For example, a throughput dropped metric was monitored at 1002 packets per ms and available bandwidth was calculated at 0.432 GigaBytes (GB). The above Table 3 is illustrative of one exemplary embodiment of a carrier table 50C and should not be construed as limiting to the techniques described herein. Moreover, for ease of illustration purposes, Table 3 is shown in simplified form and may comprise any number of metrics related to any of the above described metrics monitored on a per carrier or link, e.g., links 16, basis.

Adjacency table 40D may comprise an adjacency entry that stores historical data or information for each adjacent intermediate network device, e.g., server WXs 13, with which client WX 12 connects to apply joint network acceleration services. Each adjacent entry may be associated with an IP address assigned to that one of server WX 13 and store the above described metrics monitored on a per adjacency basis. The following Table 4 illustrates an exemplary configuration of an adjacency table 50D:

TABLE 4

| Adjacency | Network Acceleration Services | No. Connections Remaining | Destinations |
| --- | --- | --- | --- |
| 198.188.112.1 | HTTP, NSC, FTP | 224 | 192.188.111.1 |
|  |  |  | 192.188.111.2 |
|  |  | 40 |  |
| 198.188.112.2 | MAPI, CIFS, NSC | 433 | 192.188.111.1 |

As shown above, the adjacent intermediate network device assigned IP address 198.188.112.1 has a single adjacency entry storing historical data related to three metrics, e.g., network acceleration services, number (no.) of connections remaining and destinations accessible through this adjacent device. For each category of metric, two historical data point has been stored. For example, a network acceleration services metric was monitored stating that this adjacent intermediate network device supports HTTP acceleration, NSC compression and FTP acceleration network acceleration services, the number of connections remaining has decreased from 224 to 40 and connects to two destinations assigned IP addresses 192.188.111.1 and 192.188.111.2. The above Table 3 is illustrative of one exemplary embodiment of a adjacency table 50D and should not be construed as limiting to the techniques described herein. Moreover, for ease of illustration purposes, Table 3 is shown in simplified form and may comprise any number of metrics related to any of the above described metrics monitored on a per adjacency, e.g., client WXs 13, basis.

Based on this historical information stored to tables 50, data analysis module 51 may analyze tables 50 to determine the efficacy of the application of the plurality of network acceleration services 42 to LAN traffic 36. Data analysis module 51 may, in some instances, evaluate the application of two or more network acceleration services to particular types or classifications of LAN traffic 36 and determine a single efficacy representing the application of the two or more network acceleration services 42. Data analysis module 51 may also determine the efficacy on a relative basis. That is, data analysis module 51 may comprise past or prior data to current data to determine an efficacy with respect to past performance. In this manner, data analysis module 51 may analyze trends or other statistics of relevance to the application of network acceleration services 42 and determine whether one or more of the plurality of network acceleration services 42 as currently applied to LAN traffic 36 according to service configuration 44 is efficient or effective.

For example, data analysis module 51 may access client table 50A to lookup a particular client or endpoint device 24 for which a packet is currently being processed by servicing engine 34. Servicing engine 34 may forward the source IP address assigned to this one of endpoint devices 24 to adaptive service selection module 46, whereupon data analysis module 51 performs a lookup in client table 50A to retrieve a client entry corresponding to that IP address.

Data analysis module 51 may then determine the efficacy of particular network acceleration services applied to packets originating from that one of endpoint devices 24. If a caching service had been previously applied, for example, data analysis module 51 may inspect historical data stored for the cache hit-to-miss ratio metric. If this metric is trending downward, data analysis module may determine this caching service is ineffective. Alternatively or in conjunction with the above caching service, data analysis module 51 may also determine the efficacy of a compression service applied to packets originating from this particular one of endpoint devices 24 by inspecting historical data corresponding to a compression ratio metric. Likewise, data analysis module 51 may perform a similar analysis for any other metric monitored on a per client basis.

Next, data analysis module 51 may determine the efficacy of particular network acceleration services applied to packets destined for a particular destination. Again, servicing engine 34 may determine a destination IP address from the packet and forward this destination IP address to data analysis module 51. Data analysis module 51 may use this destination IP address as a key to performing a lookup of destination table 50B to retrieve a destination entry associated with the destination IP address. Data analysis module 51 may then evaluate the sluggishness and other metrics to determine the efficacy of applying a particular service to packets destined for the destination associated with the destination IP address. For example, data analysis module 51 may determine that the particular destination assigned the forwarded destination IP address has begun to drop an increasing number of connections. Data analysis module 51 may therefore determine that it would be a waste of system resources, and therefore ineffective, to apply any compression network acceleration services to packets destined for this destination.

In network environments where only one WAN link couples branch network 20 to campus network 18, data analysis module 51 may be configured only to inspect these first two tables 50A, 50B, as only one carrier and adjacency typically exists in these situations. Likewise, service monitoring module 48 may only be configured to monitor metrics on a per client and destination basis and therefore both of carrier and adjacency tables 50C and 50D may not store any information in these instances. However, in network environments, such as that shown in FIG. 1, data analysis module 51 may next analyze carrier table 50C and adjacency table 50D to further refine on which of links 16 to forward the packets and, as a result, with which of adjacent intermediate network devices 13 to establish the middle TCP session.

For example, data analysis module 51 may access adjacency table 50D by using the destination IP address described above as a key to determine that more than one adjacency device couples to the same destination. In other words, data analysis module 51 may perform a lookup of a destination column of adjacency table 50D, such as that shown in Table 4 above, using the destination IP address as a key, whereupon data analysis module 51 may determine that two or more adjacency entries have the destination IP address listed in the destination column. Adjacency table 50D (although not shown above in Table 4) may further list the interface used to reach this adjacent intermediate network device, e.g., server WXs 13, and these adjacency entries may also list the interface. Using this interface as a key, data analysis module 51 may then access carrier table 50C to retrieve carrier entries corresponding to those links. Given the historical data stored to both the two or more adjacency entries and corresponding interface or carrier entries, data analysis module 51 may further refine the selection of which link and, as a result, adjacent intermediate network device 13 to use to reach particular destination.

Data analysis module 51 may therefore implement an algorithm or otherwise perform operations that balance all of historical data corresponding to the metrics determined through lookup of tables 50 to determine the efficacy of network acceleration services 42 as applied to a particular flow or connection and, in some instances, given a particular link and adjacent intermediate network devices 13. Data analysis module 51 may determine this on a per flow basis as metrics are maintained and analyzed on a per client and destination basis and a flow typically describes a single direction or flow of traffic from a given client to a given destination. Thus, by analyzing metrics corresponding to a particular client and destination, data analysis module 51 may determine the efficacy of network acceleration services as applied to a particular flow or connection.

Based on this determination or analysis, adaptive service selection module 46 may adaptively or dynamically reconfigure the application of network acceleration services 42 to LAN traffic 36. Adaptive service selection module 46 may adapt the application of network acceleration services 42 by dynamically updating service configuration 31 to adaptively add or remove network acceleration services 42 within current associations defined by service configuration 31. Typically, as shown in FIG. 2, adaptive service selection module 46 updates service configuration 31 by creating an override association in override service configuration 44.

This override association overrides the static configuration maintained in service configuration 31, in that servicing engine 34 only applies those network acceleration services maintained by override service configuration 44 unless no associates are defined for a particular packet. Thereafter, adaptive service selection module 46 may alter the override association corresponding to a particular association of static service configuration 31 by editing the override association. In instances where no override associations exist, servicing engine 34 may apply the associations defined in the rules received from classifier module 30. Adaptive service selection module 46 may also adapt the application of network acceleration services 42 by creating new override associations between network acceleration services 42 and one or more of flows, sessions, connections (e.g., link), applications, protocols, etc. In this way, adaptive service selection module 46 may adapt the application of network acceleration services 42 to more efficiently utilize system resources and possibly improve network performance.

After dynamically adapting the application of network acceleration services 42 in the above manner, servicing engine 34 may continue to receive LAN packets 36 from classifier module 30 and apply the plurality of network acceleration services 42 in accordance with the override service configuration 44. As a result, control unit 26 may require less cycles to process particular packets associated with flows, sessions, connections, applications, protocols, etc. for which one or more network acceleration services 42 were disassociated or removed within override service configuration 44. Moreover, as some network acceleration services 42 may be added or new associations may be created, additional network acceleration services 42 may be applied to possibly improve network performance and decrease the consumption of bandwidth, thereby possibly reducing costs and increasing download speeds.

Figure 3:
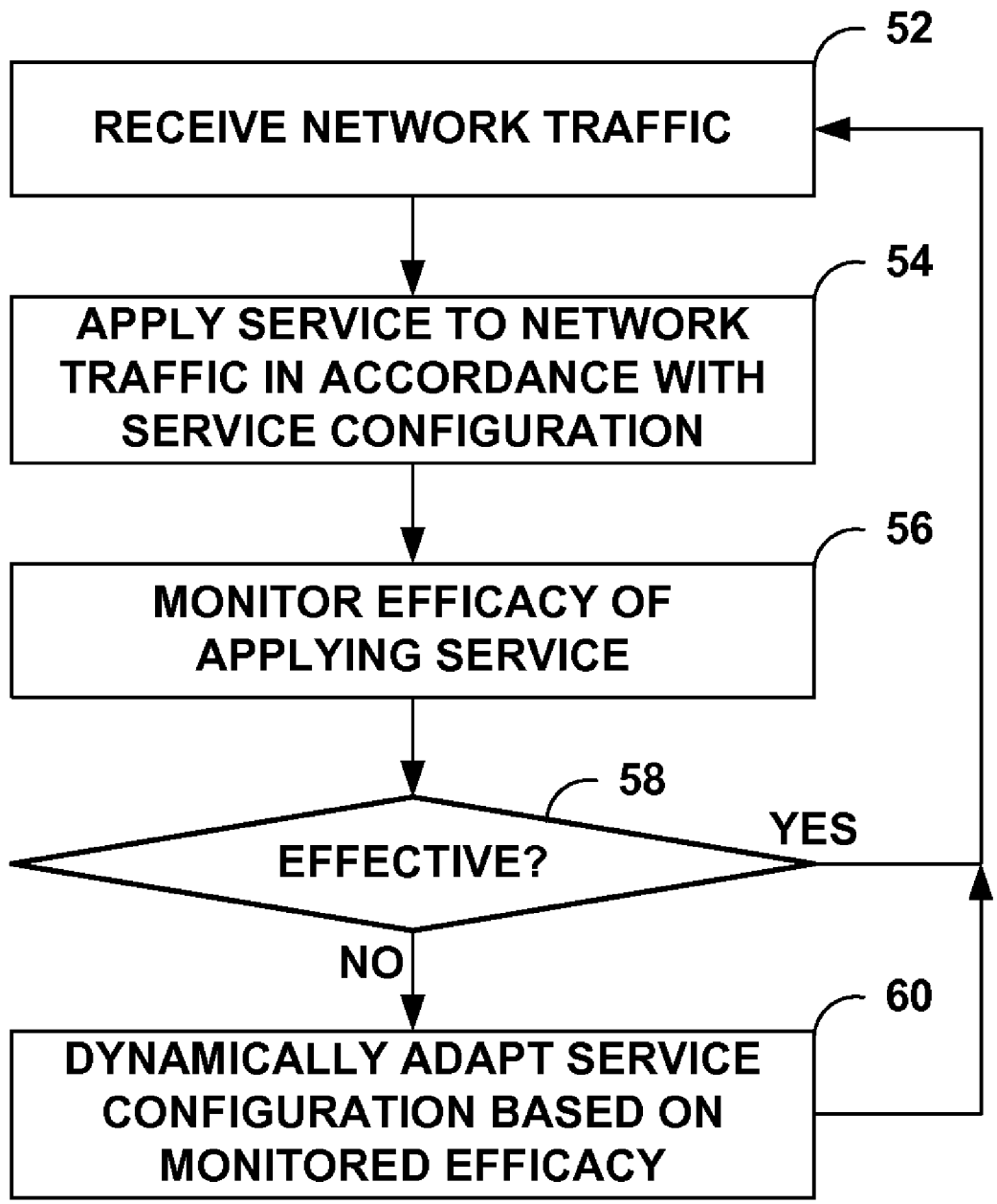
FIG. 3 is a flowchart illustrating exemplary operation of an intermediate network device in performing the techniques described herein.

FIG. 3 is a flowchart illustrating exemplary operation of an intermediate network device, such as client WX 12 of FIG. 2, in performing the techniques described herein. Initially, routing engine 28 of client WX 12 receives traffic 36, whereupon routing engine 28 forwards traffic 36 to classifier module 30 (52). Classifier module 30 may, as described above, extract or otherwise parse information from each packet of traffic 36 to classify each packets as belonging to a particular flow, session, connection, application, protocol, or any other classification type, which may be referred to herein as "classification information." Using this classification information as a key, classifier module 30 may next perform a lookup in service configuration 31 to determine whether any rules exist specifying which network acceleration services to apply to each packet. Classifier module 30 may then forward each packet, the classification information and any rules determined from the lookup to servicing engine 34. Servicing engine 34 may then apply one or more of the plurality of network acceleration services 42 to traffic 36 in accordance with the rules determined by classifier module 30 from the lookup of service configuration 31(54).

In parallel or simultaneous to the application of network acceleration services 42, adaptive service selection module 46 monitors the application of the plurality of network acceleration services 42 to traffic 36 to determine whether the application of network acceleration services 42 results in an improvement of the efficiency with which traffic 36 is serviced. As described above, service monitoring module 48 may monitor a plurality of different metrics in order to generate information by which such efficiency may be measured. Modules 48 may store this information to tables 50 either by replacing previous information or adding this new information to one or more entries of each of tables 50 to create historical records, data or information pertaining to each monitored metric. Based on the information stored to these tables 50, data analysis module 51 may determine trends and perform other statistical analysis to evaluate the efficiency or efficacy of application of network acceleration services 42 (58).

If each and every monitored one of network acceleration services 42 is effective, adaptive service selection module 46 may not dynamically adapt or adjust the application of network acceleration services 42 as specified by the rules or associations of service configuration 31. Instead, client WX 12 may continue to receive traffic, apply network acceleration services 42 in accordance with service configuration 31, and continue monitoring the efficacy the application of these network acceleration services 42 (52-58). However, if data analysis module 51 determines that one or more of the monitored ones of network acceleration services 42 are ineffective, adaptive service selection module 46 may dynamically adapt service configuration 31 by creating or otherwise updating one or more override rules or associations within override service configuration 44 to alter the application of the plurality of network acceleration services 42 to traffic 36 (60). Upon receiving additional traffic 36, servicing engine 36 may apply network acceleration services 42 in accordance with dynamically adapted service configuration, e.g., override service configuration 44, such that traffic 36 is more efficiently serviced (52, 54).

By adapting the application of network acceleration services in this manner, client WX 12 may override static rules defined by admin 40 to more efficiently apply these network acceleration services. For example, admin 40 may statically define a rule within service configuration 31 that applies one or more network acceleration services 42 to a particular port, e.g., port 80, of client WX 12. Client WX 12 may then monitor the application of those network acceleration services to the traffic that includes a port header value of 80 and determine the efficacy of these network acceleration services 42. If not effective, client WX 12 may override that static configuration by adapting the rule to remove those network acceleration services determined not to be effective. That is, client WX 12 may define an override rule or association within override service configuration 44 that specifies, for traffic including the port header value of 80, none of network acceleration services 42 should be applied, thereby overriding the above rule.

Figure 4:
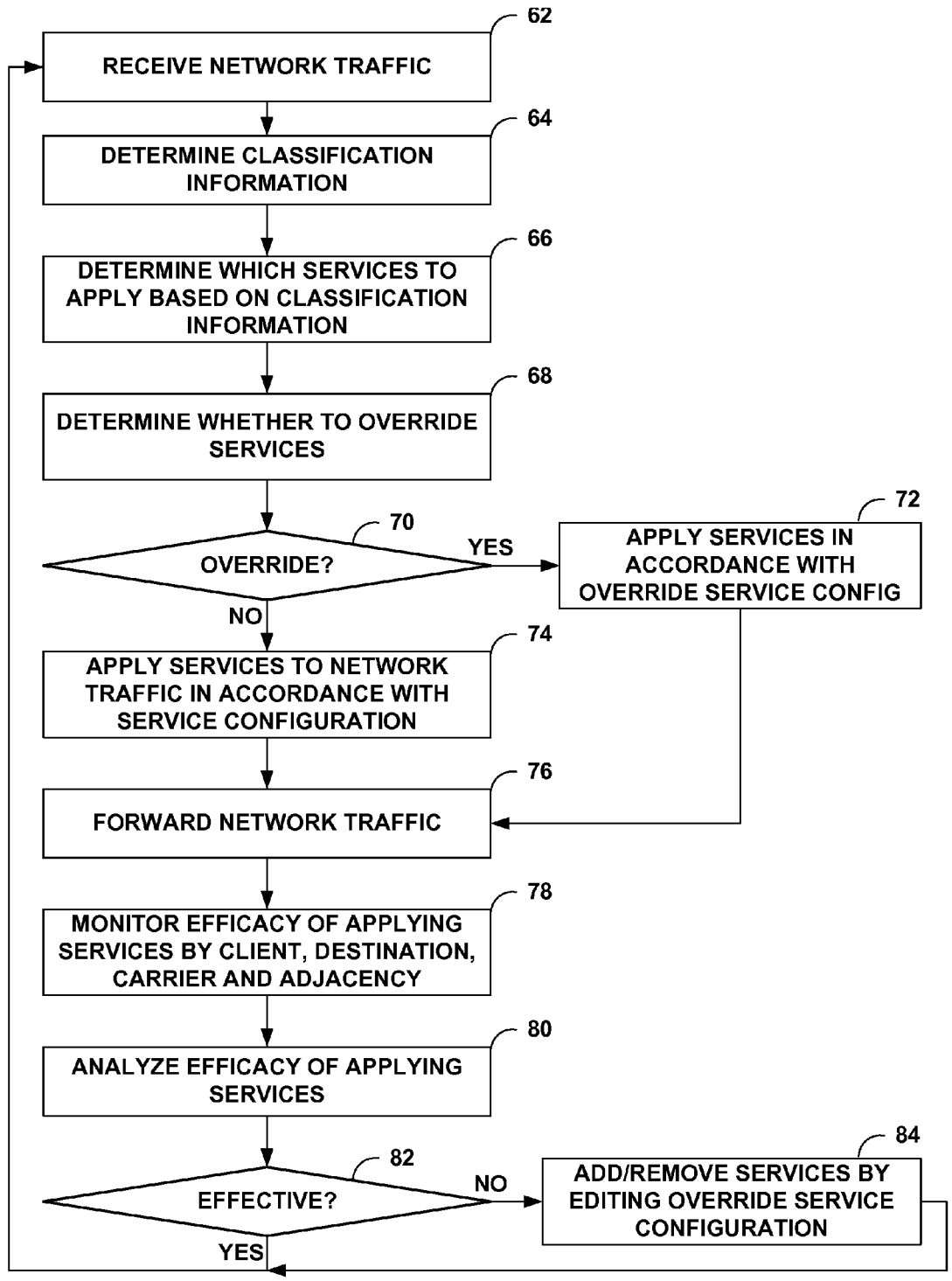
FIG. 4 is a flowchart illustrating exemplary operation of an intermediate network device in dynamically adapting the application of network acceleration services in more detail.

FIG. 4 is a flowchart illustrating exemplary operation of an intermediate network device, such as client WX 12 of FIG. 2, in dynamically adapting the application of network acceleration services in more detail. As described above, routing engine 28 of client WX 12 may receive traffic 36 and forward the traffic to classifier module 30, which may determine the above described classification information for each packet of network traffic 36 (62, 64). Classifier module 30 may then, as described above, perform a lookup of service configuration 31 based on the classification information to determine which of network acceleration services 42 to apply to each packet of network traffic 36 (66). As described above, classifier module 30 may determine one or more rules or association via the lookup of service configuration 31 that identify which of network acceleration services 42 to apply to each packet. Classifier module 30 forwards the packet, the classification information and the rules to servicing engine 34.

After receiving the packet, classification information and rules, servicing engine 34 may first access override service configuration 44 using the classification information to determine whether to override the network acceleration services identified by the rules, e.g., which define statically configured associations of network acceleration services (68). If servicing engine 34 determines that an override rule or association exists in override service configuration 44, servicing engine 34 may, as described above, then apply those network acceleration services in accordance with the override rule, or more generally, override service configuration 44 (70 "YES," 72). If servicing engine 34 determines that on override rule does not exist in override service configuration 44, servicing engine 34 may, as described above, apply those network acceleration services identified by the rules received from classifier module 30, or more generally, apply network acceleration services 42 in accordance with service configuration 31 (70 "NO," 74). After applying those network acceleration services 42, servicing engine 34 may forward each packet to classifier module 30, which in turn forwards each packet to routing engine 28. Routing engine 28 may forward each packet as either of WAN traffic 38 (76).

In parallel or simultaneous to the application of network acceleration services 42, adaptive service selection module 46 may monitor the efficacy of applying those network acceleration services 42 to each packet by client, destination, carrier and adjacency, as described above (78). As described above, adaptive service selection module 46 and, more particularly, service monitoring module 48 may only monitor the efficacy of network acceleration services 42 by client and destination in instances where only a single link or carrier and, as a result, a single adjacent intermediate network device, e.g., server WX 13A, can be used to reach a given destination, e.g., server 22A. In these instances, monitoring the efficacy of both links and adjacencies provides little if any benefit, as adaptive service selection module 46 may not further refine the application of network acceleration services 42 based on these monitored metrics, e.g., there is not a choice of links or adjacent intermediate network devices. Thus, while described herein, with respect to monitoring the application of network acceleration services 42 by these metrics, the techniques may monitor the efficacy of applying network acceleration services 42 based on one or more metrics of one or more categories and should not be so limited to the exemplary monitoring and dynamic adaption described herein.

Data analysis module 51 may routinely or periodically or, in some instances, continually analyze tables 50 to determine the efficacy of applying network acceleration services 42 (80). As described above, data analysis module 51 may analyze the efficacy on a per flow or connection basis by analyzing each of the three TCP sessions described above, which may represent three separate segments of a given flow from client (e.g., one of endpoint devices 24) to destination (e.g., one of servers 22). That is, data analysis module 51 may analyze the efficacy of applying network acceleration services 42 on the first segment of the flow by analyzing client table 50A. Next, data analysis module 51 may analyze the efficacy of applying network acceleration services 42 on the last or third segment of the flow by analyzing destination table 50B. Third, data analysis module 51 may analyze the efficacy of applying network acceleration services 42 on the middle or second segment of the flow by analyzing both carrier table 50C and adjacency table 50D. Similar to service monitoring module 48, data analysis module 51 may only perform this middle flow segment analysis if a plurality of links and, therefore, adjacencies are available to reach a given destination. Data analysis module 51 may then, based on each of these separate analysis, determine whether the application of network acceleration services 42 improves the efficiency with which the network traffic is serviced.

As described above, data analysis module 51 may determine this efficiency on any of the above metrics, e.g., compression ratio, cache hit-to-miss ratio, throughput, latency, bandwidth remaining, etc. Additionally, data analysis module 51 may factor in costs to transmit data over particular links, and as a result, the efficiency with which data is serviced may refer to cost or monetary efficiency. Thus, data analysis module 51 may implement algorithm or otherwise perform operations that balance all of historical data corresponding to the metrics determined through lookup of tables 50 to determine the efficacy of network acceleration services 42 as applied to a particular flow or connection and, in some instances, given a particular link and adjacent intermediate network devices 13.

If data analysis module 51 determines that at least one of those network acceleration services 42 applied to traffic 36 are ineffective (82 "NO"), adaptive service selection module 46 may edit override service configuration 44 to add and/or remove one or more of network acceleration services 42 specified as applying to that flow (84). In this respect, override service configuration 44 may be flow specific and maintain override rules on a per flow basis. However, if data analysis module 51 were to determine the efficacy of network acceleration services 42 based on a different basis, e.g., a per protocol basis instead of a per flow basis, or on one or more bases, override service configuration 44 may maintain these override rules on those other one or more bases as well. That is, override service configuration 44 may mirror the analysis algorithm in this way. If data analysis module 51, however, determines that each of those network acceleration services 42 for which an analysis was performed are effective, adaptive service selection module 46 may not update or otherwise edit override service configuration 44 and client WX 12 may continue to receive traffic 36, classify each packet, apply network acceleration services 42, analyze the application, dynamically adapt the application, and otherwise perform the principles of the invention in the manner described herein (62-84).

Figure 5:
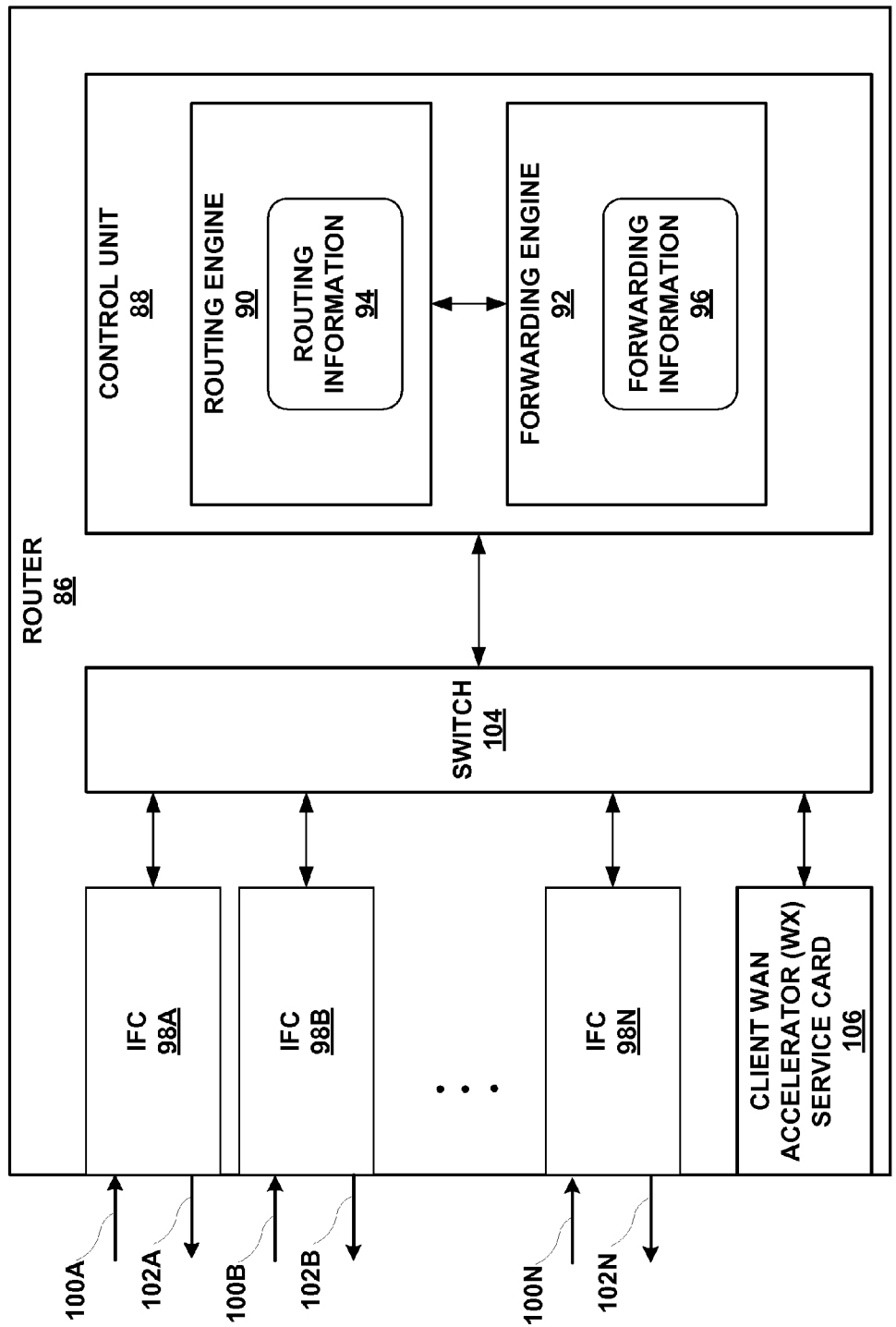
FIG. 5 is a block diagram illustrating a router that having an integrated client WX service plane that dynamically adapts the application of network acceleration services in accordance with the principles of the invention described herein.

FIG. 5 is a block diagram illustrating a router 86 that dynamically adapts the application of network acceleration services in accordance with the principles of the invention described herein. Although described with respect to router 86, any network device, such as a hub, switch, et cetera may implement the techniques described herein and the principles of the invention should not be limited to this exemplary embodiment.

As shown in FIG. 5, router 86 includes a control unit 88 that comprises a routing engine 90 and a forwarding engine 92. Routing engine 90 is primarily responsible for maintaining routing information 94 to reflect the current topology of a network and other network entities to which it is connected. In particular, routing engine 90 updates routing information 94 to accurately reflect the topology of the network and other entities. In accordance with routing information 96, forwarding engine 92 maintains forwarding information 96 that associates network destinations with specific next hops and corresponding interfaces ports.

Router 86 includes a set of interface cards (IFCs) 98A-98N ("IFCs 98") for communicating packets via inbound links 100A-100N ("inbound links 100") and outbound links 102A-102N ("outbound links 102"). Each of IFCs 98 couple to and communicate with control unit 98 via switch 104. Switch 104 may comprise any communication medium capable of communicatively coupling one or more endpoints, e.g., IFCs 98, control unit 88, and client Wide Area Network (WAN) accelerator (X) service card 106. Forwarding engine 92 may receive packet forwarded via switch 104 from IFCs 98 and forward those packets via switch 104 and IFCs 98 on outbound links 104A-104N according to forwarding information 96. In this manner, forwarding engine 92 provides the forwarding functionality of router 86.

Router 86 also includes a client wide area network (WAN) accelerator (X) service card 106 ("client WX service card 106"). Client WX service card 106 may be substantially similar to client WX 12 in that client WX service card 106 may include a control unit that comprises substantially the same user interface, classifier module, servicing engine (including adaptive service selection module, etc.) as that of client WX 12. In this respect, client WX service card 94 may perform the techniques described above with respect to client WX 12 in substantially the same manner as that of client WX 12.

Client WX service card 94 may however not include a routing engine similar to that of client WX 12 as control unit 88 may perform the routing functions. In this regard, client WX service card 94 may differ from client WX 12 described above. That is, router 86 may receive the packets via incoming links 100, whereupon IFCs 98 forward those packets via switch 104 to forwarding engine 92. Forwarding engine 92 may maintain information requiring that packets associated with particular flows, as one example, should be first sent to client WX service card 106 prior to forwarding those packets via one of outbound links 102.

Forwarding engine 92 may then forward these packets to client WX service card 106 for processing or servicing in the manner described above. These packets may, therefore, arrive similar to LAN traffic 36 however these packets may be received directly by classifier module 30, in this instance. Client WX service card 106 may also dynamically adapt the application of network acceleration services, e.g., network acceleration services 42, in accordance with the techniques described herein. After servicing, client WX service card 106 may forward the packets back to forwarding engine 92 via switch 104, whereupon forwarding engine 92 forwards the packets via one of outbound links 102.

Client WX service card 106 may therefore comprise any card or other removable processing unit that may be inserted into a slot. Client WX service card 106 may, once inserted into the slot, interface with switch 104, whereby client WX service card 106 may receive, service and forward packets in accordance with the principles of the invention. In this manner, any network device may implement the techniques described herein to improve the efficiency with which network traffic is processed.

Various embodiments of the invention have been described. These and other embodiments are within the scope of the following claims.

The invention claimed is:

1. A method comprising:
    receiving, with an intermediate network device, network traffic from a first network for delivery to a second network;
    applying, with the intermediate network device, a first set of at least two of a plurality of network acceleration services to the network traffic in accordance with a service configuration to improve efficiency with which the network traffic is communicated;
    monitoring data corresponding to one or more metrics for each at least two of the plurality of network acceleration services of the first set over a period of time;
    storing the data to one or more tables included within the intermediate network device as historical data:
    analyzing the historical data stored to each of the one or more tables to determine whether the application of the one or more of the plurality of network acceleration services improves the efficiency with which the network traffic is communicated;
    after monitoring the application of the first set of network acceleration services, dynamically adapting, with the intermediate network device, the service configuration to apply a second set of the plurality of network acceleration services to the network traffic based on the determination, wherein the first set and second set of network acceleration services differ in at least two of the network acceleration services; and
    applying, with the intermediate network device, the second set of the plurality of network acceleration services to the network traffic in accordance with the dynamically adapted service configuration such that the network traffic is more efficiently communicated.

2. The method of claim 1, wherein the network acceleration services are specific to different types of network traffic corresponding to different types of network communication protocols.

3. The method of claim 2, wherein the network communication protocols include one or more of a Common Internet File System (CIFS) protocol, a File Transfer Protocol (FTP), a Secure Socket Layer (SSL) protocol, a Messaging Application Programming Interface (MAPI), a Transmission Control Protocol (TCP), and a Session Initiation Protocol (SIP).

4. The method of claim 2, wherein dynamically adapting the service configuration comprises dynamically adding to the service configuration one of the plurality of network acceleration services for one of the types of the network traffic to which the intermediate network device had not previously applied the one of the plurality of network acceleration services.

5. The method of claim 2, wherein dynamically adapting the service configuration comprises dynamically removing from the service configuration one of the plurality of network acceleration services for one of the types of the network traffic to which the intermediate network device had previously applied the one of the plurality of network acceleration services.

6. The method of claim 1, wherein applying the first set of at least two of the plurality of network acceleration services comprising applying one or more of a compression service or a content caching service.

7. The method of claim 1, wherein the one or more tables comprise a client table, a destination table, a carrier table and an adjacency table.

8. The method of claim 1, wherein the one or more metrics comprise one or more a cache hit-to-miss ratio for a cache of compressed data strings, a compression ratio for the data strings within the cache, a response time, a latency, a number of connections dropped, a number of connection remaining, a throughput, a bandwidth remaining on a link, a network acceleration services supported by an adjacent intermediate network device, a destination reachable by the adjacent intermediate network device, and a cost per unit data for the link.

9. The method of claim 1, wherein dynamically adapting the service configuration comprises dynamically adapting the service configuration to alter the application of the plurality of network acceleration services to the network traffic based on the analysis of the historical data corresponding to one or more of the metrics.

10. The method of claim 1, wherein dynamically adapting the service configuration comprises dynamically editing an override service configuration to alter the application of network acceleration services as specified in the service configuration.

11. The method of claim 10,
    wherein the service configuration defines a plurality of rules that each define which of the plurality of network acceleration services apply to the network traffic,
    wherein the override service configuration defines a plurality of override rules that overrides a corresponding one or more of the plurality of rules to redefine which of the plurality of network acceleration services apply to the network traffic,
    wherein applying the plurality of network acceleration services to the network traffic in accordance with the dynamically adapted service configuration comprises:
    determining that one or more of the plurality of rules of the service configuration apply to a particular packet of the network traffic;
    determining that a corresponding one or more of the plurality of override rules overrides the determined one or more of the plurality of rules; and
    applying one or more of the plurality of network acceleration services based on the determination that one or more of the plurality of override rules apply to the particular packet such that the network traffic is more efficiently communicated.

12. The method of claim 1, further comprising receiving, with the intermediate network device, input from a user that statically defines (i) a rule that statically associates one or more of the plurality of network acceleration services with a characteristic of the network traffic and (ii) a best effort rule that enables the dynamic adaption of the at least one of the plurality of network acceleration services defined by the rule.

13. The method of claim 1, wherein monitoring, with the intermediate network device, the application of the at least one of the plurality of network acceleration services to the network traffic comprises:
    monitoring the application of the at least one of the plurality network acceleration services with respect to an endpoint device;
    updating a client entry associated with the endpoint device in a client table with client historical data pertaining to the monitoring with respect to the endpoint device;
    monitoring the application of the at least one of the plurality network acceleration services with respect to a destination;
    updating a destination entry associated with the destination in a destination table with destination historical data pertaining to the monitoring with respect to the destination;

monitoring the application of the at least one of the plurality network acceleration Services with respect to a link of a carrier;

updating a link entry associated with the link of the carrier in a carrier table with link historical data pertaining to the monitoring with respect to the link of the carrier;

monitoring the application of the at least one of the plurality network acceleration services with respect to an adjacent intermediate network device, wherein the adjacent intermediate network device jointly cooperates with the intermediate network device to apply one or more of the plurality of network acceleration services;

updating a client entry associated with the adjacent intermediate network device in an adjacency table with adjacency historical data pertaining to the monitoring with respect to the adjacent intermediate network device; and analyzing, on a per flow basis, two or more of the client historical data, the destination historical data, the link historical data and the adjacency historical data to determine whether the application of each of the at least one service improves the efficiency with which the network traffic is communicated.

14. The method of claim 1 wherein the intermediate network device comprises a wide area network (WAN) acceleration (X) device.

15. An intermediate network device comprising:
a classifier module that receives network traffic from a first network for delivery to a second network; and
a servicing engine that:
applies a first set of at least two of a plurality network acceleration services to the network traffic in accordance with a service configuration to improve efficiency with which the network traffic is communicated;
monitors data corresponding to one or more metrics for each at least two of the plurality of network acceleration services of the first set over a period of time;
stores the data to one or more tables included within the intermediate network device as historical data;
analyzes the historical data stored to each of the one or more tables to determine whether the application of the one or more of the plurality of network acceleration services improves the efficiency with which the network traffic is communicated;
after monitoring the application of the first set of network acceleration services, dynamically adapts the service configuration to apply a second set of the plurality of network acceleration services to the network traffic based on the determination, wherein the first set of network acceleration services and the second set of network acceleration services differ in at least two of the network acceleration services; and
applies the second set of the plurality of network acceleration services to the network traffic in accordance with the dynamically adapted service configuration such that the network traffic is more efficiently communicated.

16. The device of claim 15, wherein the network acceleration services are specific to different types of network traffic corresponding to different types of network communication protocols.

17. The device of claim 16, wherein the network communication protocols include one or more of a Common Internet File System (CIFS) protocol, a File Transfer Protocol (FTP), a Secure Socket Layer (SSL) protocol, a Messaging Application Programming Interface (MAPI), a Transmission Control Protocol (TCP), and a Session Initiation Protocol (SIP).

18. The device of claim 16, wherein the servicing engine dynamically adapts the service configuration by dynamically adding to the service configuration one of the plurality of network acceleration services for one of the types of the network traffic to which the intermediate network device had not previously applied the one of the plurality of network acceleration services.

19. The device of claim 16, wherein the service engine dynamically adapts the service configuration by dynamically removing from the service configuration one of the plurality of network acceleration services for one of the types of the network traffic to which the intermediate network device had previously applied the one of the plurality of network acceleration services.

20. The device of claim 15, wherein the servicing engine applies the at least one of the plurality of network acceleration services comprising applying one or more of a compression service or a content caching service.

21. The device of claim 15, wherein the one or more tables comprise a client table, a destination table, a carrier table and an adjacency table.

22. The device of claim 15, wherein the one or more metrics comprise one or more a cache hit-to-miss ratio for a cache of compressed data strings, a compression ratio for the data strings within the cache, a response time, a latency, a number of connections dropped, a number of connection remaining, a throughput, a bandwidth remaining on a link, a network acceleration services supported by an adjacent intermediate network device, a destination reachable by the adjacent intermediate network device, and a cost per unit data for the link.

23. The device of claim 12, wherein the servicing engine dynamically adapts the service configuration by dynamically adapting the service configuration to alter the application of the plurality of network acceleration services to the network traffic based on the analysis of the historical data corresponding to one or more of the metrics.

24. The device of claim 15, wherein the servicing engine dynamically adapts the service configuration by dynamically editing an override service configuration to alter the application of network acceleration services as specified in the service configuration.

25. The device of claim 24,
wherein the service configuration defines a plurality of rules that each define which of the plurality of network acceleration services apply to the network traffic,
wherein the override service configuration defines a plurality of override rules that overrides a corresponding one or more of the plurality of rules to redefine which of the plurality of network acceleration services apply to the network traffic,
wherein the servicing engine applies the plurality of network acceleration services to the network traffic in accordance with the dynamically adapted service configuration by:
determining that one or more of the plurality of rules of the service configuration apply to a particular packet of the network traffic;
determining that a corresponding one or more of the plurality of override rules overrides the determined one or more of the plurality of rules; and
applying one or more of the plurality of network acceleration services based on the determination that one or more of the plurality of override rules apply to the particular packet such that the network traffic is more efficiently communicated.

26. The device of claim 15, further comprising a user interface module that receives input from a user that statically defines (i) a rule that statically associates one or more of the plurality of network acceleration services with a characteristic of the network traffic and (ii) a best effort rule that enables the dynamic adaption of the at least one of the plurality of network acceleration services defined by the rule.

27. The device of claim 15, wherein the servicing engine monitors the application of the at least one of the plurality of network acceleration services to the network traffic by:
monitoring the application of the at least one of the plurality network acceleration services with respect to an endpoint device;
updating a client entry associated with the endpoint device in a client table with client historical data pertaining to the monitoring with respect to the endpoint device;
monitoring the application of the at least one of the plurality network acceleration services with respect to a destination;
updating a destination entry associated with the destination in a destination table with destination historical data pertaining to the monitoring with respect to the destination;
monitoring the application of the at least one of the plurality network acceleration services with respect to a link of a carrier;
updating a link entry associated with the link of the carrier in a carrier table with link historical data pertaining to the monitoring with respect to the link of the carrier;
monitoring the application of the at least one of the plurality network acceleration services with respect to an adjacent intermediate network device, wherein the adjacent intermediate network device jointly cooperates with the intermediate network device to apply one or more of the plurality of network acceleration services;
updating a client entry associated with the adjacent intermediate network device in an adjacency table with adjacency historical data pertaining to the monitoring with respect to the adjacent intermediate network device; and
analyzing, on a per flow basis, two or more of the client historical data, the destination historical data, the link historical data and the adjacency historical data to determine whether the application of each of the at least one service improves the efficiency with which the network traffic is communicated.

28. The device of claim 15, wherein the intermediate network device comprises a wide area network (WAN) acceleration (X) device.

29. A network system comprising:
a first network that includes a plurality of endpoint devices;
a second network that includes one or more devices that provide content, wherein the first network includes an intermediate network device comprising:
a classifier module that receives network traffic from one or more of the plurality of endpoint devices of the first network for delivery to the second network; and
a servicing engine that:
applies a first set of at least two of a plurality of network acceleration services to the network traffic in accordance with a service configuration to improve efficiency with which the network traffic is communicated;
monitors data corresponding to one or more metrics for each at least two of the plurality of network acceleration services of the first set over a period of time;
stores the data to one or more tables included within the intermediate network device as historical data;
analyzes the historical data stored to each of the one or more tables to determine whether the application of the one or more of the plurality of network acceleration services improves the efficiency with which the network traffic is communicated;
after monitoring the application of the first set of network acceleration services, dynamically adapts the service configuration to apply a second set of the plurality of network acceleration services to the network traffic based on the determination, wherein the first set and second set of network acceleration services differ in at least two of the network acceleration services; and
applies the second set of the plurality of network acceleration services to the network traffic in accordance with the dynamically adapted service configuration such that the network traffic is more efficiently communicated.

30. The system of claim 29, wherein the network acceleration services are specific to different types of network traffic corresponding to different types of network communication protocols.

31. The system of claim 30, wherein the network communication protocols include one or more of a Common Internet File System (CIFS) protocol, a File Transfer Protocol (FTP), a Secure Socket Layer (SSL) protocol, a Messaging Application Programming Interface (MAPI), a Transmission Control Protocol (TCP), and a Session Initiation Protocol (STP).

32. The system of claim 30, wherein the servicing engine dynamically adapts the service configuration by dynamically adding to the service configuration one of the plurality of network acceleration services for one of the types of the network traffic to which the intermediate network device had not previously applied the one of the plurality of network acceleration services.

33. The system of claim 30, wherein the service engine dynamically adapts the service configuration by dynamically removing from the service configuration one of the plurality of network acceleration services for one of the types of the network traffic to which the intermediate network device had previously applied the one of the plurality of network acceleration services.

34. The system of claim 29, wherein the servicing engine applies the at least one of the plurality of network acceleration services comprising applying one or more of a compression service or a content caching service.

35. The system of claim 29, wherein the servicing engine dynamically adapts the service configuration by dynamically editing an override service configuration to alter the application of network acceleration services as specified in the service configuration.

36. The system of claim 35,
wherein the service configuration defines a plurality of rules that each define which of the plurality of network acceleration services apply to the network traffic,
wherein the override service configuration defines a plurality of override rules that overrides a corresponding one or more of the plurality of rules to redefine which of the plurality of network acceleration services apply to the network traffic,
wherein the servicing engine applies the plurality of network acceleration services to the network traffic in accordance with the dynamically adapted service configuration by:
determining that one or more of the plurality of rules of the service configuration apply to a particular packet of the network traffic;
determining that a corresponding one or more of the plurality of override rules overrides the determined one or more of the plurality of rules; and
applying one or more of the plurality of network acceleration services based on the determination that one or more of the plurality of override rules apply to the particular packet such that the network traffic is more efficiently communicated.

37. A non-transitory computer-readable medium comprising instructions for causing a programmable processor to:
   receive, with an intermediate network device, network traffic from a first network for delivery to a second network;
   apply, with the intermediate network device, a first set of at least two of a plurality of network acceleration services to the network traffic in accordance with a service configuration to improve efficiency with which the network traffic is communicated;
   monitor data corresponding to one or more metrics for each at least two of the plurality of network acceleration services of the first set over a period of time:
   store the data to one or more tables included within the intermediate network device as historical data;
   analyze the historical data stored to each of the one or more tables to determine whether the application of the one or more of the plurality of network acceleration services improves the efficiency with which the network traffic is communicated;
   after monitoring the application of the first set of network acceleration services, dynamically adapt, with the intermediate network device, the Service configuration to apply a second set of the plurality of network acceleration services to the network traffic based on the determination, wherein the first set and second set of network acceleration services differ in at least two of the network acceleration services; and
   apply, with the intermediate network device, the second set of the plurality of network acceleration services to the network traffic in accordance with the dynamically adapted service configuration such that the network traffic is more efficiently communicated.

38. The non-transitory computer-readable medium of claim 37, wherein the network acceleration services are specific to different types of network traffic corresponding to different types of network communication protocols.

39. The non-transitory computer-readable medium of claim 38, wherein the network communication protocols include one or more of a Common Internet File System (CIFS) protocol, a File Transfer Protocol (FTP), a Secure Socket Layer (SSL) protocol, a Messaging Application Programming Interface (MAPI), a Transmission Control Protocol (TCP), and a Session Initiation Protocol (SIP).

40. The non-transitory computer-readable medium of claim 38, wherein dynamically adapting the service configuration comprises dynamically adding to the service configuration one of the plurality of network acceleration services for one of the types of the network traffic to which the intermediate network device had not previously applied the one of the plurality of network acceleration services.

41. The non-transitory computer-readable medium of claim 38, wherein dynamically adapting the service configuration comprises dynamically removing from the service configuration one of the plurality of network acceleration services for one of the types of the network traffic 10 which the intermediate network device had previously applied the one of the plurality of network acceleration services.

* * * * *